US009709671B1

(12) United States Patent
Slater

(10) Patent No.: US 9,709,671 B1
(45) Date of Patent: Jul. 18, 2017

(54) ELECTROSOUND CAMERA

(71) Applicant: Dan Slater, La Habra Heights, CA (US)

(72) Inventor: Dan Slater, La Habra Heights, CA (US)

(*) Notice: Subject to any disclaimer, the term of this patent is extended or adjusted under 35 U.S.C. 154(b) by 209 days.

(21) Appl. No.: 14/463,221

(22) Filed: Aug. 19, 2014

(51) Int. Cl.
 *H04N 5/30* (2006.01)
 *G01S 7/52* (2006.01)

(52) U.S. Cl.
 CPC ........... *G01S 7/52023* (2013.01); *H04N 5/30* (2013.01)

(58) Field of Classification Search
 CPC .............................. G01S 7/52023; H04N 5/30
 USPC ......................................................... 348/163
 See application file for complete search history.

(56) References Cited

U.S. PATENT DOCUMENTS

| 235,199 | A | | 12/1880 | Bell |
|---|---|---|---|---|
| 235,496 | A | | 12/1880 | Bell |
| 241,909 | A | | 5/1881 | Bell et al. |
| 341,213 | A | | 5/1886 | Bell |
| 3,657,547 | A | | 4/1972 | Mansfield |
| 3,713,721 | A | * | 1/1973 | Watson .................. G02F 1/113 347/255 |
| 4,421,985 | A | | 12/1983 | Billingsley et al. |
| 4,443,757 | A | | 4/1984 | Bui |
| 4,666,259 | A | | 5/1987 | Iizuka |
| 5,122,805 | A | | 6/1992 | Peterman et al. |
| 5,389,790 | A | | 2/1995 | Honey |
| 5,940,519 | A | | 8/1999 | Kuo et al. |
| 6,034,760 | A | * | 3/2000 | Rees ..................... G01N 21/455 356/28.5 |
| 6,731,570 | B1 | | 5/2004 | Langdon |
| 7,027,353 | B2 | | 4/2006 | Melese et al. |
| 7,551,519 | B2 | | 6/2009 | Slater |
| 7,580,533 | B2 | | 8/2009 | Schwartz |
| 7,938,010 | B2 | | 5/2011 | Villanucci et al. |
| 8,232,866 | B2 | | 7/2012 | McGrath et al. |
| 8,488,123 | B1 | | 7/2013 | Clark |
| 8,659,686 | B1 | | 2/2014 | Clark |
| 9,348,021 | B2 | | 5/2016 | Wallace |
| 2005/0220310 | A1 | | 10/2005 | McGrath |

(Continued)

OTHER PUBLICATIONS

Chen, V.C., et al, "Micro-Doppler Effect in Radar: Phenomenon, Model, and Simulation Study", *IEEE Transactions on Aerospace and Electronic Systems*, vol. 42, No. 1, pp. 2-21, Jan. 2006.

(Continued)

*Primary Examiner* — William C Vaughn, Jr.
*Assistant Examiner* — Jae N Noh
(74) *Attorney, Agent, or Firm* — Fitzsimmons IP Law

(57) ABSTRACT

Systems, devices and methods for obtaining or providing listening involve utilizing one or more electromagnetic signal (energy) detection-facilitated modulation sensing devices to sense audio frequency modulated signals received from or associated with one or more illuminated and/or luminous objects; and generating or providing a listening output of the sensing device(s), the listening output including signals and/or information indicating or providing a representation of a disturbance to an electromagnetic field or fields at or associated with at least one of said one or more objects, the disturbance being or including an audio frequency modulation of a signal from or associated with (e.g., received from) at least one of said one or more objects.

67 Claims, 11 Drawing Sheets

(56) References Cited

U.S. PATENT DOCUMENTS

2008/0151694 A1* 6/2008 Slater .................. G01H 9/00
  367/178
2015/0051473 A1* 2/2015 Huang ................ A61B 5/0095
  600/407
2016/0061946 A1* 3/2016 Wallace ............. G01S 13/5242
  342/161

OTHER PUBLICATIONS

Liu, B. and Chen, R., "Software Defined Radar and Waveforms for Studying Micro-Doppler Signatures", Radar Sensor Technology XVIII, *Proc. of SPIE* vol. 9077, 907718-1 (published May 29, 2014).

Iannuzzelli, R.J., et al., "Aircraft Wake Detection Using Bistatic Radar: Analysis of Experimental Results", *Johns Hopkins APL technical digest*, 19(3), Jul.-Sep. 1998, pp. 299-314.

Slater, D., "High resolution long range terrestrial imaging", *Proc. SPIE 5896*, Unconventional Imaging, 58960B (Aug. 30, 2005).

Bell, A.G., "On the Production and Reproduction of Sound by Light", American Journal of Sciences, Third Series, vol. XX, No. 118, Oct. 1880, pp. 305-324.

Slater, D., "Passive long range acousto-optic sensor", *Proc. SPIE 6304*, Free-Space Laser Communications VI, 63040E (Sep. 1, 2006).

Slater, D. and Shaw, S., "Remote sensing with passive specular probes", *Proc. SPIE 6709*, Free-Space Laser Communications VII, 67090W (Sep. 25, 2007).

Dekker, P.L. and Fraiser, S.J., "Radio Acoustic Sounding with a UHF Volume Imaging Radar", *Journal of Atmospheric and Ocean Technology*, vol. 21 (May 2004).

Hanson, J.M. and Marcotte, F.J., "Aircraft Wake Vortex Detection Using Continuous-Wave Radar", Johns Hopkins APL Technical Digest, vol. 18, No. 3 (Jul.-Sep. 1997).

Anon, "Terminology and Assessment Methods of Solid Propellant Rocket Exhaust Signatures", AGARD Advisory Report AR-287 (Feb. 1993).

Lee, R.H.C., et al., "Studies of Plasma Properties in Rocket Plumes", Aerospace Corporation Report SD-TR82-44 (May 17, 1982).

"Radio acoustic sounding system", Wikipedia, the free encyclopedia, https://en.wikipedia.org/w/index.php?title=Radio_acoustic_sounding_system&oldid=599941882 (downloaded Apr. 18, 2014).

"RASS (Radio Acoustic Sounding System)—Introduction", http://apollo.lsc.vsc.edu/classes/remote/lecture_notes/profilers/rass_intro.html (downloaded Apr. 18, 2014).

Davis, A., et al., "The Visual Microphone: Passive Recovery of Sound from Video", *ACM Transactions on Graphics*, vol. 33, No. 4, Article 79 (Jul. 2014).

Wu, H.-Y., et al., "Eulerian Video Magnification for Revealing Subtle Changes in the World", *ACM Transactions on Graphics (TOG)—Proceedings of ACM SIGGRAPH 2012*, vol. 31, Issue 4, Jul. 2012, Article No. 65 (Publication Date: Aug. 5, 2012).

Rubinstein, M., "Analysis and Visualization of Temporal Variations in Video", PhD thesis, Massachusetts Institute of Technology, Feb. 2014.

Ulyanov, Y.N., et al., "Combined Antenna for a Mobile System of Radioacoustic Sounding", International Conference on Antenna Theory and Techniques, Oct. 6-9, 2009, Lviv, Ukraine pp. 271-273.

Clark, F.O., et al., "Passive optical detection of a vibrating surface", *SPIE Newsroom*, http://spie.org/x109259.xml?WT.mc_id=KNRSENSEMEAE (published on-line Aug. 1, 2014).

* cited by examiner

ELECTROSOUND CAMERA

CROSS-REFERENCES TO RELATED APPLICATIONS

This application is related to U.S. patent application Ser. No. 11/644,374, entitled "Passive Long Range Acoustic Sensor", filed on Dec. 21, 2006 (now U.S. Pat. No. 7,551,519, issued on Jun. 23, 2009), which is hereby incorporated by reference.

TECHNICAL FIELD

The invention relates generally to sensing technologies and, in particular, to systems, devices and methods for obtaining or providing listening and involving of or utilizing, for example, an electromagnetic carrier and/or an electromagnetic signal detection-facilitated listening device, mechanism, or capability.

BACKGROUND ART

There are circumstances when human senses are incapable of, or incompetent (e.g., impaired), obstructed, or vulnerable to interference (of various sorts) in relation to, acquiring information relevant to an environment or place at or near a person's location or, by way of another example, in relation to a tracked, projected or otherwise determined path along with the person is walking, driving, etc. Even with the aid of conventional listening devices (e.g., microphones, hearing aids) and viewing devices (e.g., cameras, corrective lenses), in some circumstances even persons without hearing or vision impairments are prevented from acquiring or at least timely acquiring such information, which in some instances may be of critical importance or interest to that person. For example, a person who is listening to music while driving, or walking or bicycling while wearing headphones, may not hear or see an emergency (or other motorized) vehicle approaching from around a sharp corner in the road in sufficient time or until it is too late to avoid a collision. Human senses and conventional listening and viewing devices alike, in some circumstances may not (or cannot) sense or detect objects, events or phenomena of actual or potential interest or concern to a person, or sounds or information associated with or related to such objects, events or phenomena, even if the person is attempting to hear or see (such objects, events or phenomena) utilizing all or various of such senses and conventional listening and viewing devices as may be available. In some environments and circumstances, one or more of the aforementioned human senses and conventional listening and viewing devices may not be suitable for sensing (or detecting) in relation to acquiring sounds or information associated with or related to such objects, events or phenomena.

It would be helpful to be able to provide a listening device, system or methodology that facilitates sensing (or detecting) of or in relation to such objects, events or phenomena, and obtaining or providing sounds or information associated with or related to such objects, events or phenomena.

It would be helpful to be able to provide a listening device or system that provides aural capability (e.g., short range aural capability, long range aural capability, or both) in a manner other than, and independent of whether the device or system utilizes, conventional acoustic or vibration sensing (or detecting) responsive to the movement of air or other molecules.

It would be helpful in some circumstances to be able to provide a listening device or system capable of operation in a vacuum or other environment entirely or substantially devoid of matter (or atmosphere).

It is contemplated and envisioned by the inventor(s) of the present invention(s) that it would be helpful in some circumstances to be able to provide a listening device or system (e.g., such as described herein) to a device or system that does not generate or otherwise provide or obtain a viewing output (e.g., captured images).

It is contemplated and envisioned by the inventor(s) of the present invention(s) that it would be helpful in some or other circumstances to be able to provide a listening device or system (e.g., such as described herein) to a device or system that is capable of or adaptable to be capable of generating or otherwise providing or obtaining a viewing output (e.g., captured images).

It is contemplated and envisioned by the inventor(s) of the present invention(s) that it would be helpful to be able to provide a listening device or system (e.g., such as described herein) to one or more of the following: a device or system for providing or obtaining viewing and/or listening outputs, signals, or content; a camera or other image capturing device or system; a device or system for providing, obtaining, utilizing, generating or reproducing sounds; hearing aids and hearing augmentation devices and systems; devices and systems facilitating or utilizing sensory enhancement and/or sensed feedback; headphones; wearable technology items or apparel; personal computing and/or communications devices or peripherals; warning or detection devices or systems; safety and other specialized devices or systems; detection or measurement (and analysis) devices and systems involving, for example, aerospace, diagnostic, medical, meteorological, military, security, or space applications.

In relation to the aerospace industry, for example, many interesting and potentially observable things can happen during an aerospace vehicle flight test. On board sensors provide a good view of the vehicle state assuming that radio telemetry links can be maintained or on board recorders can be recovered. Motion picture film cameras have been used onboard test and chase aircraft to provide visual records of flight test events. Recoverable film camera pods were sometimes carried on early space launch vehicles but use was limited by the technical complexities and expense of post flight film recovery. These camera pods observed rocket engine plume characteristics, staging, engine start and shutdown, propellant tank ullage, spacecraft deployment and other flight phenomena. Space launch vehicles now often carry non recoverable television cameras with real time video downlinks.

Additional flight test information can be remotely obtained using space, airborne, ship and ground based sensors. Space assets and aircraft to a lesser extent are difficult to access and very costly to use. In the past, ground based flight test sensors were primarily large tracking radars and long range optics. These systems are government owned with access being expensive and difficult or impossible to obtain for private use. Moreover, the high acquisition and operating costs and operational complexities of currently available long range telescopic camera systems frequently result in an undersampling of desired imagery and associated spatial, temporal and geometric data.

Cinema started in the late 1800's with the introduction of the moving picture. This was followed shortly thereafter with color movies. Next was the introduction of recorded sound with early experiments starting around 1900, major film studio interest by 1927 and becoming very popular by 1930. For a long time the sound recordings were monophonic until the production of the stereophonic Disney film "Fantasia", in 1947. By 1953 stereophonic sound was becoming commonplace and next was multichannel audio recording. Essentially all Hollywood feature films produced since 1930 include a sound track and now virtually all feature films include multichannel audio. Of great importance typically in modern cinema is the technical production of high resolution color imagery of excellent quality in addition to a high quality synchronized multichannel sound track.

In relation to a camera or other image capturing device or system having aural as well as visual capabilities, it would be helpful to be able to provide one or more of: improved sensor performance and/or utilization, better low light (imaging) sensitivity, and simplified associated electronics.

SUMMARY OF THE INVENTION

In example embodiments and implementations, one or more illuminated and/or luminous objects (e.g., including an object that is illuminated by ambient optical, microwave or radio wave electromagnetic energy and/or self-luminous) are sensed. In example embodiments and implementations, nearby vicinities or environments in relation to the objects(s) are additionally (or alternatively) sensed. The illuminated and/or luminous objects can be, or can include portions of, man made vehicles. For example, flight vehicles produce sounds and vibrations that modulate the local electromagnetic environment. These audio frequency modulations can be sensed in some circumstances by or utilizing passive optical and radio wave detectors. Acousto-optic sensing methods can be used, e.g., optical Remote Acoustic Sensing (RAS) can be used to detect launch vehicle acoustic emissions as described herein. In example and envisioned embodiments or implementations, acousto-optic and/or radioacoustic sensing technologies are utilized, for example, a radioacoustic sensor using passive micro-Doppler radar techniques. By way of another example, visual, aural and radar observations of a rocket launch can be utilized. The synchronized high resolution picture and sound combination produces a cinema like viewing and listening experience useful in various applications and industries such as, for example, aerospace and cinema.

Example embodiments described herein involve a device or system that provides aural capability (e.g., short range aural capability, long range aural capability, or both). In example implementations, such a device or system provides or facilitates aural capability in a manner other than, and independent of whether the device or system utilizes, conventional acoustic or vibration sensing (or detecting) responsive to the movement of air or other molecules. In example implementations, such a device or system includes or utilizes one or more electromagnetic signal (energy) detection-facilitated audio frequency modulation sensing (AFMS) devices and is capable of operation in a vacuum or other environment entirely or substantially devoid of matter (or atmosphere). Such sensing devices include, for example, both optical and radio frequency (RF) "acoustic sensing" devices which utilize detection of audio frequency modulated signals (e.g., passive reflections from a vehicle), and are also sometimes referred to herein as Remote Acoustic Sensing (RAS) devices. As discussed below in greater detail, radio frequency (RF) RAS devices can detect other types of modulations as well. In some implementations, one or more RAS devices can be utilized, or adapted to be utilized, as a "raw detector" directly providing a listening output that is not filtered or processed.

The term RAS as used herein is not intended to be associated with sensor performance or functionality that is necessarily preclusive of utilizing such a sensor at distances not considered to be remote, and to the extent those of skill in the art might understand or believe sensors referred to as "remote acoustic sensors" or "RAS" (or sensing referred to as "remote acoustic sensing") to be limited in use or sensing capabilities only to remote sensing, it is the express intent of the inventor(s) that this term not be so limited even if it is contrary to any such shared understanding or belief, commonly understood meaning, or ordinary usage.)

Some example embodiments described herein involve a device or system that provides long range aural capability. Such devices or systems can include or utilize, for example, one or more acoustic sensing device(s) and a telescopic lens, optics, or other optical component add-ons.

Not all embodiments of the invention(s) herein facilitate or utilize long range aural capability. A device or system that does not provide long range aural capability can include or utilize, for example, one or more acoustic sensing device(s) (e.g., a RAS detector with no telescopic or other optical component add-ons).

Not all embodiments of the invention(s) herein include or utilize a telescopic lens, optics, or other optical component add-ons. RAS sensors can additionally or alternatively be utilized with normal and wide angle lenses, or without any lenses.

In relation to human sensory observable viewing and listening, in example embodiments and implementations, a viewing output, a listening output, both, or only one or the other is generated or provided.

Example embodiments described herein involve a device or system that generates or provides a viewing output (e.g., images captured by one or more imaging sensors) and/or a listening output (e.g., sound and/or information extracted or otherwise obtained from sensed audio frequency modulated signals as described herein). For example, a means for presenting the viewing and listening outputs as a sound movie including time synchronized single or multichannel audio can be provided by or utilize one or more of the devices or systems referenced herein or components thereof. In example embodiments and implementations, one or more acoustic sensing devices (e.g., AFMS device(s) such as described herein) generate or facilitate providing a listening output. The one or more acoustic sensing devices include, for example: an acoustic sensing device including or adapted to utilize optical and/or radio wave detectors; one or more sensors, transducers, and/or other mechanisms responsive to energy in the optical and/or radio frequency electromagnetic spectral regions; and/or one or more sensing technologies that operate in optical and/or radio frequency electromagnetic spectral regions. In example embodiments and implementations, the one or more acoustic sensing devices include (or consist of) one or more multispectral sensing devices that facilitate sensing in multiple different electromagnetic spectral regions (e.g., in both optical and radio frequency (RF) electromagnetic spectral regions). In other example embodiments and implementations, the one or more acoustic sensing devices include (or consist of) sensing devices that facilitate sensing only in radio frequency (RF) electromagnetic spectral regions.

In an example embodiment, a method for obtaining or providing listening includes: utilizing one or more sensing devices (e.g., electromagnetic signal (energy) detection-facilitated audio frequency modulation sensing (AFMS) devices) to detect or obtain audio frequency modulated signals received from or associated with one or more illuminated and/or luminous objects; and generating or providing a listening output of the sensing device(s) (e.g., an audio signal), the listening output including signals and/or information indicating or providing a representation of a disturbance to an electromagnetic field or fields at or associated with at least one of said one or more objects, the disturbance being or including an audio frequency modulation of a signal from or associated with (e.g., received from) at least one of said one or more objects.

Example embodiments described herein involve or facilitate providing a listening device or system (e.g., such as described herein) to a device or system that does not generate or otherwise provide or obtain a viewing output (e.g., captured images).

Other example embodiments described herein involve or facilitate providing a listening device or system (e.g., such as described herein) to a device or system that is capable of or adaptable to be capable of generating or otherwise providing or obtaining a viewing output (e.g., captured images).

Example embodiments described herein involve or facilitate providing a listening device or system (e.g., such as described herein) to one or more of the following: a device or system for providing or obtaining viewing and/or listening outputs, signals, or content; a camera or other image capturing device or system; a device or system for providing, obtaining, utilizing, generating or reproducing sounds (e.g., listening devices, technologies utilized by musicians, composers, editors, or producers of music or soundtracks, in sound design, or involving audio media or listening outputs, signals, or content in general); hearing aids and hearing augmentation devices and systems; devices and systems facilitating or utilizing sensory enhancement and/or sensed feedback (e.g., a device or system for providing "extra-sensory" inputs/information to operators of vehicles); headphones; wearable technology items or apparel (e.g., wrist watches, head gear, articles of clothing); personal computing and/or communications devices or peripherals (e.g., laptop and notebook computers, tablets, smartphones); warning or detection devices or systems (e.g., an aircraft detection device or system); safety and other specialized devices or systems (e.g., potentially benefiting visually and/or hearing impaired persons); detection or measurement (and analysis) devices and systems involving, for example, aerospace, diagnostic, medical, meteorological, military, security, or space applications.

In an example embodiment, a device for obtaining or providing listening includes (or consists of): an element of (human or non-human) industry or manufacture including or adapted to utilize or operatively interface with one or more electromagnetic signal (energy) detection-facilitated audio frequency modulation sensing (AFMS) devices, said AFMS device(s) being adapted to obtain audio frequency modulated signals received from or associated with one or more illuminated and/or luminous objects (e.g., including an object that is illuminated by ambient optical, microwave or radio wave electromagnetic energy and/or self-luminous), said element and AFMS device(s) and associated electronics being adapted to generate or facilitate providing a listening output of the AFMS device(s), the listening output including signals and/or information indicating or providing a representation of a disturbance to an electromagnetic field or fields at or associated with at least one of said one or more objects, the disturbance being or including an audio frequency modulation of a signal from or associated with at least one of said one or more objects.

As previously indicated, example embodiments described herein can involve a device or system that generates or provides a viewing output (e.g., video) and a listening output (e.g., audio). Example embodiments described herein involve or facilitate an image capturing device or system adapted to capture images of one or more objects to provide video (and/or other forms of viewing content) and to obtain audio (and/or other forms of listening content) extracted from other images of, or sensor outputs in relation to, the object(s) and in time synchronization with the video images.

Viewing content is or can be provided utilizing visual media, for example, video, film, or another mechanism for viewing or presenting viewing content. Viewing content can include or utilize a sequence of images (e.g., video, film, digital, or other images).

The terms "video", "video output" and "viewing output" as used herein are not limited to any particular form of visual media be it video, film, or another mechanism for presenting viewing content. Nor are there terms limited in their meaning to viewing or viewing content that includes or utilizes any particular form of visual media. The term "viewing output" can mean, for example, "of, relating to, or involving images that are seen, shown, presented, reproduced, generated, broadcast, transmitted, recorded, captured, obtained, acquired, or perceived in a temporal sequence."

In example embodiments and implementations, the image capturing device and the AFMS device have or utilize separate independent sensors (or detectors), that is, the devices have separate independent sensors in respect to each other. Separate imaging and RAS sensors allow each sensor to be individually optimized for the best performance. A CCD sensor that acquires both images and RAS must operate at a very high frame rate whereas if the sensors are separate, the imaging sensor can operate at a much lower frame rate and have much better low light sensitivity. The support electronics are also simpler. Moreover, optics can be separately optimized for imaging and RAS. Individual RAS receivers can be operated in wavelength regions, with different field of views and sensitivities. In some devices and systems utilizing separate imaging and RAS sensors, the sensors are or can be boresight aligned.

In an example embodiment, a device for obtaining or providing listening includes: an image capturing device capable of capturing images of illuminated and/or luminous objects, including an object that is illuminated by ambient optical, microwave or radio wave electromagnetic energy and/or self-luminous, and an electromagnetic signal (energy) detection-facilitated audio frequency modulation sensing (AFMS) device having separate independent sensors, said devices and associated electronics being adapted to capture images of one or more illuminated and/or luminous objects and to obtain audio frequency modulated electromagnetic energy utilizing sensors of said AFMS device, and to generate or facilitate providing a listening output of the AFMS device (e.g., an audio signal) in time synchronization with a viewing output (e.g., video signal) including or utilizing images of said one or more objects captured by said image capturing device, the listening output including signals and/or information indicating or providing a representation of a disturbance to an electromagnetic field or fields at or associated with at least one of said one or more objects, the disturbance being or including an audio frequency modulation of a signal from or associated with (e.g., received from) at least one of said one or more objects.

In an example embodiment, a method for obtaining or providing listening includes: capturing and/or accessing (e.g., accessing captured) images (e.g., provided by imaging sensors) of one or more illuminated and/or luminous objects (e.g., an object that is illuminated by ambient optical, microwave or radio wave electromagnetic energy and/or self-luminous, or portions of said objects) as viewing content; extracting from other images provided by one or more separate independent sensors (or detectors) adapted to obtain audio frequency modulated electromagnetic energy from said other images signals and/or information facilitating the generation and provision of listening content including an audio representation or indication of a disturbance to an electromagnetic field or fields at or associated with at least one of said one or more objects; and providing a listening output (e.g., an audio signal) determined from the extracted signals and/or information and a viewing output (e.g., video signal) from or associated with the images.

In example embodiments and implementations, the viewing and/or listening outputs (are adapted to) facilitate, control, or initiate an action or process of (or involving) presenting, reproducing, transmitting, or otherwise communicating or making accessible the listening content in time synchronization with the viewing content or one or more portions or images thereof.

Technologies and methodologies described herein can be used to obtain or provide listening device acquired sound and/or information to images (e.g., video, film, digital, or other images). The images can be of an event/object/etc. contemporaneously captured (by a separate independent sensor as described herein, for example), or previously captured images (which are to be "post processed", for example). In either case, one or more additional/alternative acoustic sensing derived listening outputs can be utilized (e.g., listening outputs obtained contemporaneously at the same event but by other parties who, for example, may have been situated differently at the venue allowing them to obtain acoustic sensing perhaps more suitable for the extraction of better quality or more interesting sounds, or simply to obtain missing audio segments). As another example, it is contemplated that listening specialists could lend their expertly or meticulously obtained listening content (in relation to particular objects and/or nearby vicinity) to viewing content (of the same objects and/or nearby vicinity, or for that matter to similar or nearby objects and vicinities) obtained by someone else. One might apply the foregoing, for example, in relation to offering a service of adding an audio track of "alien sounds" to captured UFO video footage or other viewing content.

Example embodiments described herein involve or facilitate providing a listening device, system or methodology that facilitates sensing (or detecting) of or in relation to objects, events or phenomena of actual or potential interest or concern to a person, or sounds or information associated with or related to such objects, events or phenomena, and obtaining or providing sounds or information associated with or related to such objects, events or phenomena. Such objects, events or phenomena can include, by way of example: areas/sources of listening interest in nature or in relation to or involving vehicles or other man-made objects, fireworks or other pyrotechnics, and UFOs.

In an example embodiment, a method for obtaining or providing listening includes: capturing and/or accessing (e.g., previously captured) images provided by one or more imaging device sensors (or detectors) of one or more illuminated and/or luminous objects; utilizing one or more listening device sensors (or detectors) to obtain audio frequency modulated electromagnetic energy from other images of said one or more objects for and in relation to facilitating the generation or provision of sound and/or information in association with said images (e.g., an audio track for a video generated from the video images) including an audio representation or indication of a disturbance to an electromagnetic field or fields at or associated with at least one of said one or more objects; and providing viewing and/or listening content from or associated with the images with additional and/or replacement content including said sound and/or information (e.g., additional or replacement audio for one or more portions of the viewing content).

Technologies and methodologies described herein are suitable as well in relation to adapting, modifying, enhancing, or retrofitting an image capturing device to provide a listening device or mechanism for listening to object(s) and/or nearby vicinity.

In an example embodiment, a method for obtaining or providing listening includes: adapting an image capturing device that is capable of (or adaptable to be capable of) capturing images of illuminated and/or luminous objects (e.g., an object that is illuminated by ambient optical, microwave or radio wave electromagnetic energy and/or self-luminous) to utilize one or more separate independent sensor(s) including at least one electromagnetic signal detection-facilitated audio frequency modulation sensing (AFMS) device to obtain audio frequency modulated electromagnetic energy from other images captured by or otherwise obtained utilizing said separate independent sensor(s) and to generate or facilitate providing a listening output of the AFMS device in time synchronization with a viewing output including images of one or more illuminated and/or luminous objects, the listening output including signals and/or information indicating or providing a representation of a disturbance to an electromagnetic field or fields at or associated with at least one of said one or more objects, the disturbance being or including an audio frequency modulation of a signal from or associated with at least one of said one or more objects.

Example embodiments described herein relate to technologies and methodologies for providing a camera or other image capturing device or system with long range aural as well as visual capabilities. In reference to an example embodiment described herein, a portable, passive and covert telescopic sound camera is capable of producing high resolution sound movies of flight vehicles at >100 km distances. Imagery produced by the telescopic sound camera is capable of resolving and quantifying space launch vehicle events including plume formation, staging events and fairing separation dynamics (such as payload fairing jettison).

DISCLOSURE OF INVENTION

Figure 1A:
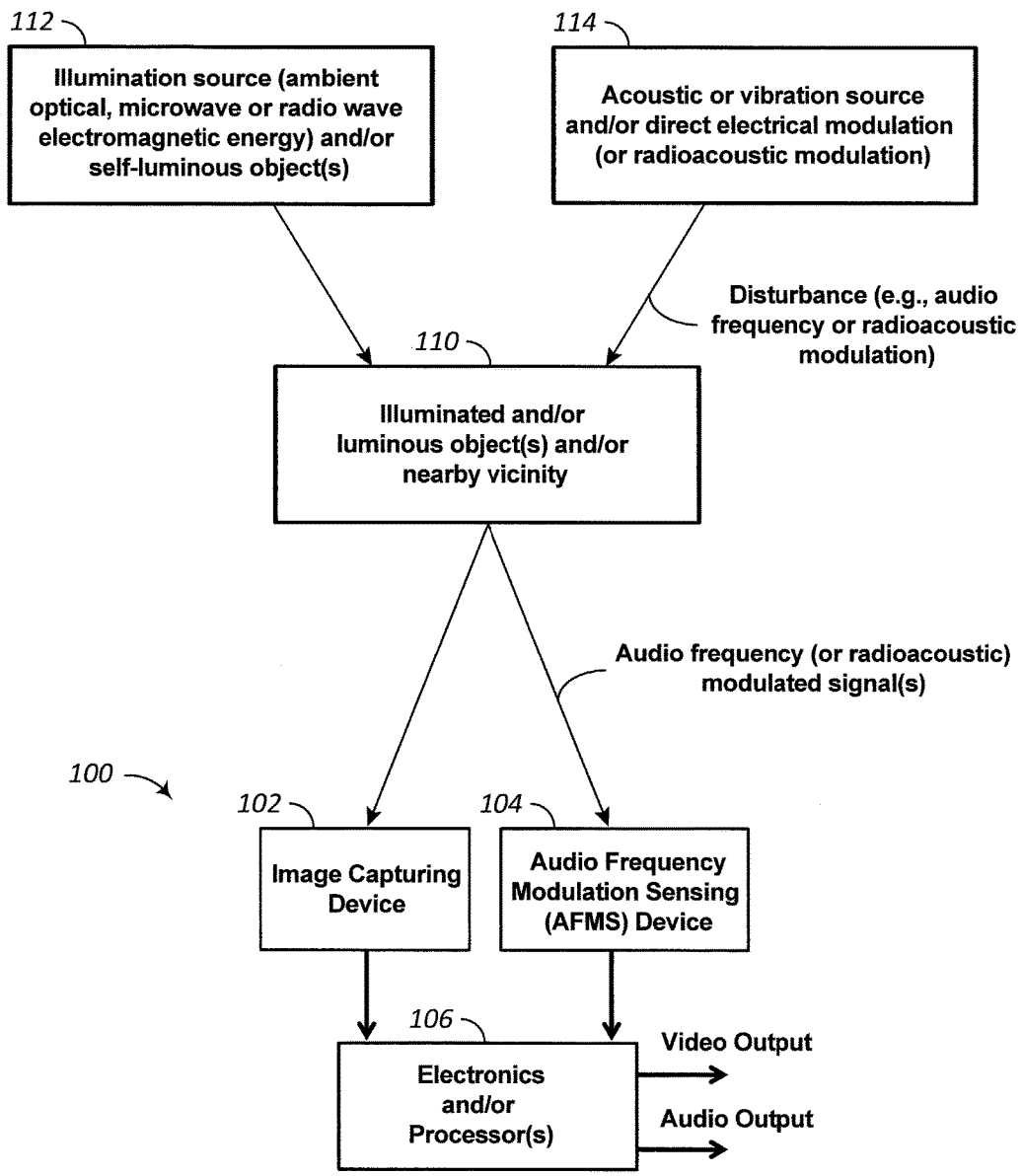
FIG. 1A shows an example embodiment of system for obtaining or providing listening, the system shown in operation sensing an audio frequency modulation of a signal from or associated with one or more illuminated and/or luminous objects.
Figure 1B:
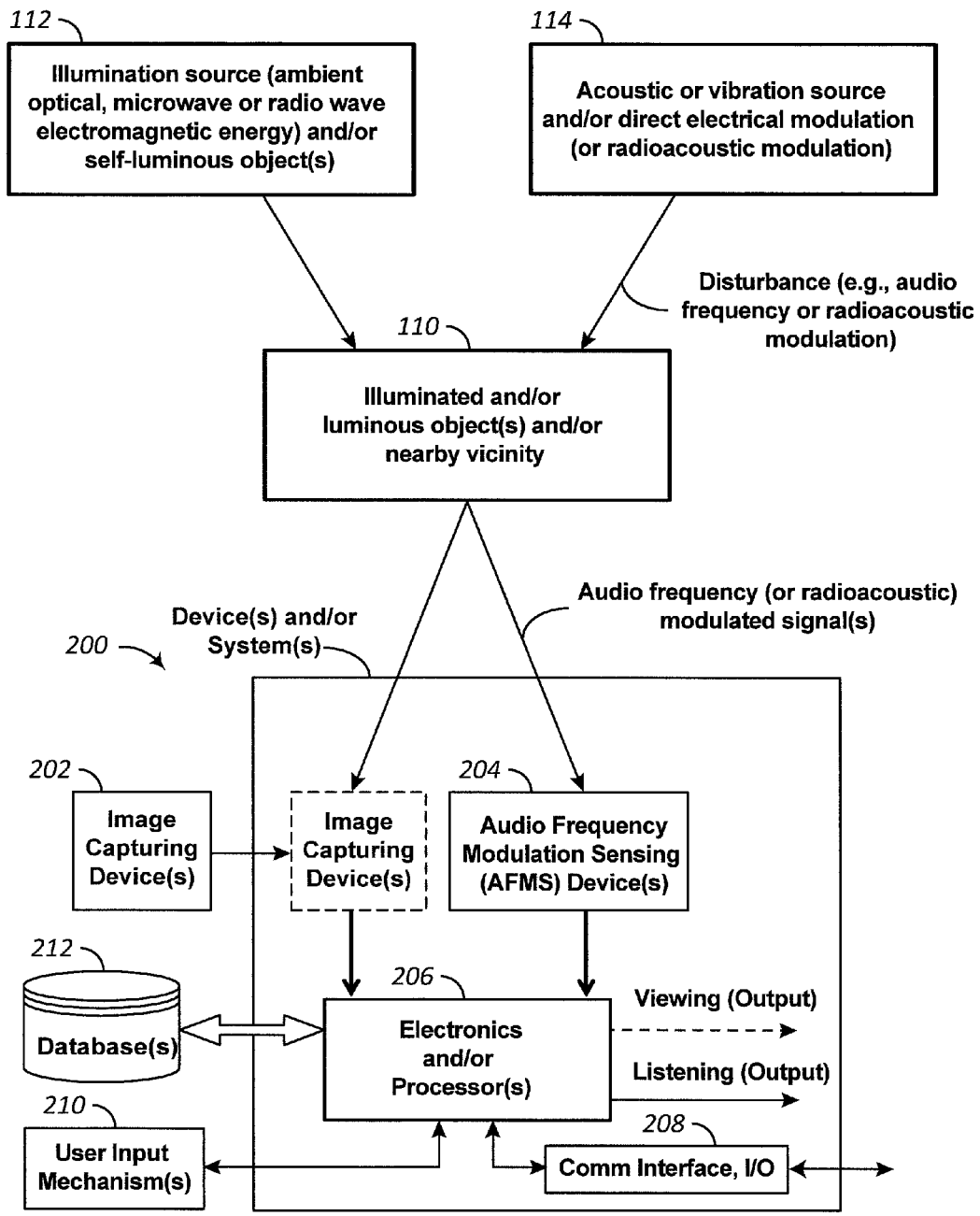
FIG. 1B shows another example embodiment of system for obtaining or providing listening according to the present invention.

The scope of the present invention(s) includes subject matter described herein and, as and if applicable, subject matter incorporated herein by reference, and it should be understood that any device or system not pictorially rendered as was done in the case of several example devices and systems (, vehicles, illuminated and/or luminous objects, etc.) in the accompanying drawings is considered to be represented by the system diagrams in FIG. 1A, FIG. 1B, or both, as applicable and in relation to particular recitations of claimed subject matter.

Referring to FIG. 1A, in an example embodiment, a sound camera 100 includes an image capturing device 102, an electromagnetic signal (energy) detection-facilitated audio frequency modulation sensing (AFMS) device 104, and electronics and/or processor(s) 106 configured as shown. In example embodiments and implementations, the image capturing device 102 and the AFMS device 104 include or utilize independent sensors (or detectors), and the electronics and/or processor(s) 106 include electronics associated with one or more of the image capturing device 102 and the AFMS device 104. Referring again to FIG. 1A, in example embodiments and implementations, the image capturing device 102 and the AFMS device 104 and associated electronics are adapted to capture images of one or more illuminated and/or luminous objects 110 and to obtain audio frequency modulated electromagnetic energy utilizing (sensors of) the AFMS device 104 and in time synchronization with images captured by the image capturing device 102, and such that the image capturing device 102 and the AFMS device 104 provide viewing (e.g., video) and listening (e.g., audio), respectively, the audio output including signals and/or information indicating or providing a representation of a disturbance to an electromagnetic field or fields at or associated with at least one of the one or more objects, the disturbance being or including an audio frequency modulation of a signal from or associated with (e.g., received from) at least one of the one or more objects.

In example embodiments and implementations, one or more of the image capturing device 102, the AFMS device 104, and the associated electronics is adapted to provide (at the video output and the audio output) a synchronized high resolution picture and sound combination. In relation to example implementations (e.g., involving or facilitating the tracking of vehicles), a general goal of a long range telescopic tracking camera or system can be for example to record the vehicle exterior and nearby vicinity at a high spatial and temporal resolution, preferably in several spectral regions, preferably from multiple viewing angles and provide accurate vehicle Time Space Position Information (TSPI). By way of example, the image capturing device 102 is or includes one or more of: an imaging telescope, a telescopic camera, an imaging microscope, a microscopy camera, a video camera, a digital camera, a television camera, a tracking (camera) system/telescope (e.g., adapted to record the vehicle exterior and nearby vicinity at a high spatial and temporal resolution, in one or more spectral regions, and preferably from multiple viewing angles and with accurate vehicle Time Space Position Information (TSPI)), and (nonrecoverable or other) space-based sensors or other assets. The image capturing device 102 can be provided in the form of a cinema or other camera that includes or utilizes one or more (aerospace) photographic technologies selected from the group comprising: space-compatible photographic, long range imaging (e.g., suitable for observing distant objects, UFO's, or other objects of interest), atmospheric seeing compensation, and aerial platforms technologies. In example embodiments and implementations, the image capturing device 102 is or includes one or more of: a night vision camera, a full spectrum digital camera, a full spectrum motion camera, and an Infrared (IR) camera (or a camera adapted or modified to accept Infrared (IR) light).

Figure 2:
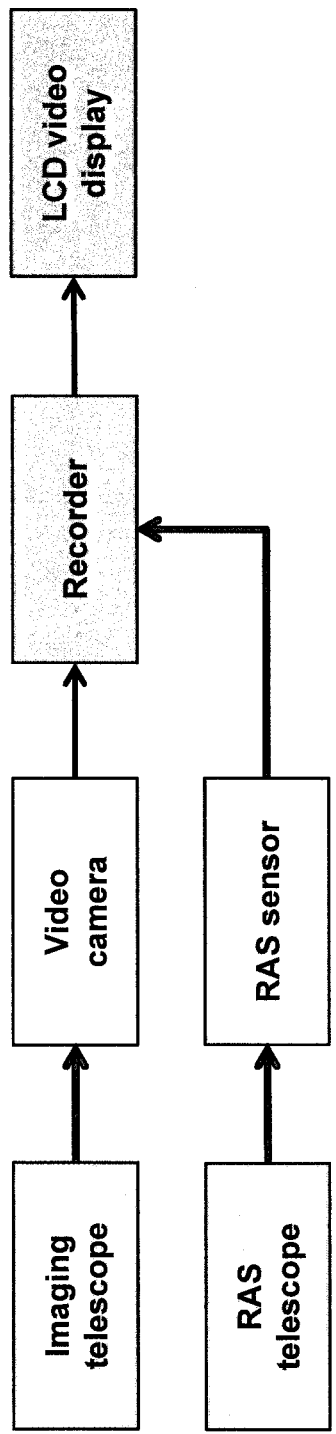
FIG. 2 is a diagram of an example telescopic sound camera system.
Figure 3:
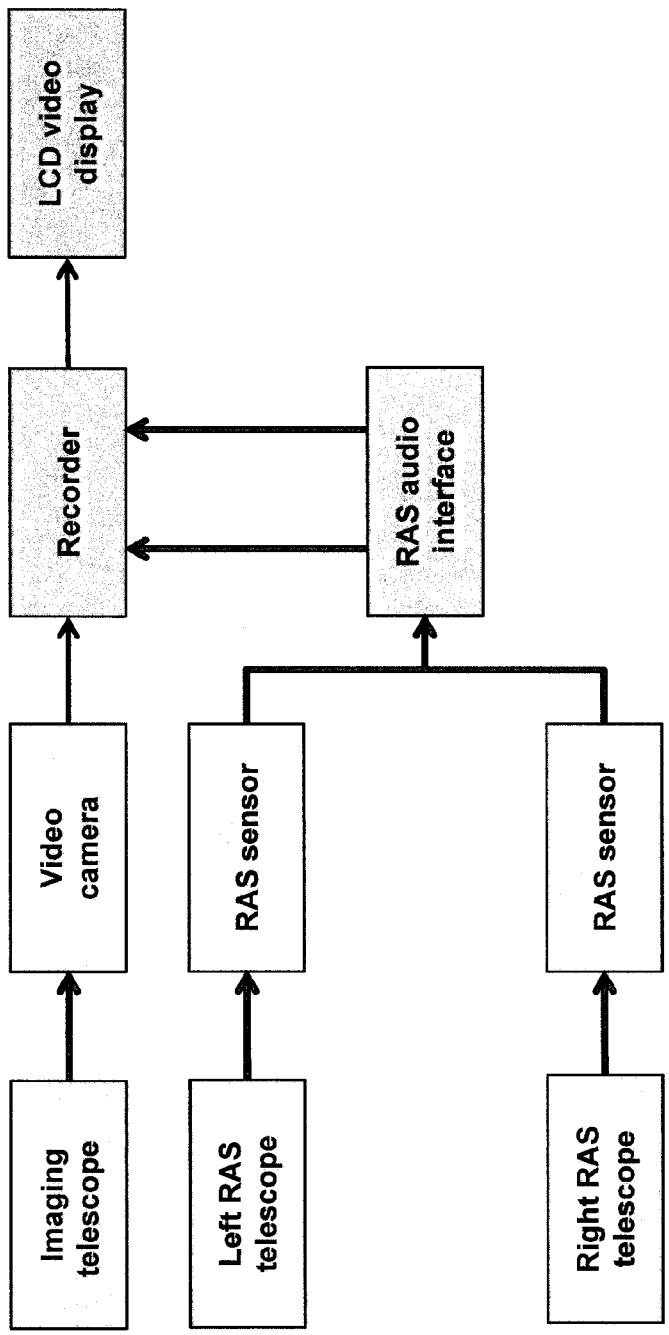
FIG. 3 is a diagram of an example telescopic sound camera system implemented to provide stereo remote audio sensing (RAS)
Figure 4:
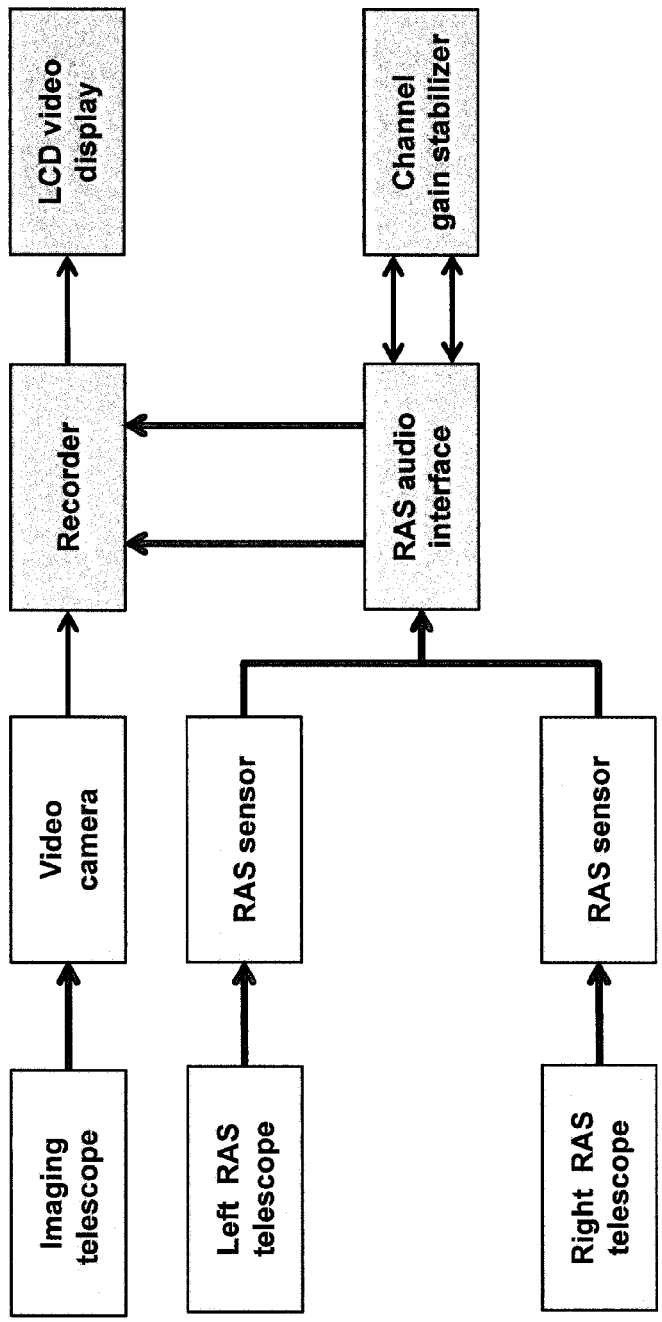
FIG. 4 is a diagram of an example telescopic sound camera system implemented to provide gain stabilized stereo RAS.
Figure 5:
FIG. 5 is a diagram of an example passive multistatic Doppler radar RAS implementation.

Further in relation to example implementations of technologies and methodologies described herein, FIG. 2 shows an example telescopic sound camera system that includes an imaging telescope, a RAS telescope, a video camera, a RAS sensor, a recorder, and a LCD video display configured as shown. FIG. 3 shows an example telescopic sound camera system implemented to provide stereo remote audio sensing (RAS), the camera system including an imaging telescope, left and right RAS telescopes, a video camera, left and right RAS sensors, a recorder, a RAS audio interface, and a LCD video display configured as shown. FIG. 4 shows an example telescopic sound camera system implemented to provide gain stabilized stereo RAS, the camera system including an imaging telescope, left and right RAS telescopes, a video camera, left and right RAS sensors, a recorder, a RAS audio interface, a LCD video display, and a channel gain stabilizer configured as shown. FIG. 5 shows an example passive multistatic Doppler radar RAS implementation that includes or utilizes a UHF antenna, a radar receiver, and a laptop (or other) computer configured as shown.

Remote Acoustic Sensor (RAS)

The telescopic sound camera uses long range Remote Acoustic Sensing (RAS) technology to recover audio frequency energy produced by a distant flight vehicle. RAS observable rocket vehicle sounds are primarily associated with skin membrane glints, aerodynamic wake turbulence and rocket engine activity. Propellers, rotors, turbines and other rotating components and flashing luminous beacons on more conventional aircraft also frequently provide strong acousto-optic signatures.

At the most basic level, audio frequency energy sources, acoustic and/or otherwise, modulate ambient electromagnetic fields near the flight vehicle. These modulated electromagnetic fields are telescopically observed by RAS which remotely recovers the ambient audio. RAS is completely passive and does not require any flight vehicle modifications. As such, this technology is compatible with non-cooperative and covert observations. The example embodiments and implementations provided herein are described in relation to two different RAS electromagnetic spectral regions, optical and radio frequency. Most of the RAS development and operation to date has been in the optical region which will be discussed first.

Optical RAS Overview

Optical RAS facilitates for example remotely sensing audio frequency intensity (amplitude) modulations of a distant luminous object. The object luminosity may be a glint illuminated by an external source such as the Sun, laser or a searchlight or alternately the object may be self-luminous. Examples of self-luminosity include rocket flames, thruster firings, exoatmospheric reentry, pyrotechnics, beacons and lights. Real world aerospace vehicles often are a combination of different sources.

Optical RAS relies on audio frequency modulation of the distant object luminosity. The audio frequency modulation may result from acoustic and vibration sources or may be non-acoustic resulting from direct electrical modulation. Combining internal or external illumination with acoustic or electrical modulation results in four distinct types of optically modulated audio sources (AOM, EOM, AME and EME). These are further described:

Reflective Acousto-Optic Modulator (AOM)

The reflective acousto-optic modulator is a modern day derivative of the Photophone as originally invented by Alexander Graham Bell in 1880. See: Bell, A. G., "On the Production and Reproduction of Sound by Light", American Journal of Sciences, Third Series, vol. XX, no. 118, October 1880, pp. 305-324; Bell, A. G., "Apparatus for Signaling and Communication, called Photophone", U.S. Pat. No. 235,199 (1880); Bell, A. G., "Photophone Receiver", U.S. Pat. No. 241,909 (1881); and Bell, A. G., "Transmitting and Recording Sounds by Radiant Energy", U.S. Pat. No. 341,213 (1886), which are hereby incorporated by reference. With reference to "Table 1: Flight vehicle optical RAS modulation mechanisms" (see below), RAS/AOM is essentially a very long range microphone implemented in the form of a passive non coherent tristatic optical vibrometer. The telescopic sound camera uses distant naturally occurring reflective and refractive acousto-optic modulators (AOM) to form very long range acousto-optic communication links.

Three free space propagation paths that converge at the AOM are required; an optical carrier illuminates the AOM, an acoustic source modulates the AOM and the AOM is read out by a distant RAS receiver. This tristatic approach is an extension of a more conventional bistatic radar link analysis. The AOM can be treated as an optical radar target with a specified optical cross section (OCS). The OCS is weakly modulated by the acoustic signal. See: Dan Slater, "Passive Long Range Acousto-optic Sensor", Proc. SPIE 6304, Free-Space Laser Communications VI, 63040E (Sep. 1, 2006); Dan Slater, "Passive Long Range Acoustic Sensor", U.S. Pat. No. 7,551,519 (Jun. 23, 2009); and Dan Slater and Sandy Shaw, "Remote Sensing with Passive Specular Probes", Proc. SPIE 6709, Free-Space Laser Communications VII, 67090W (Sep. 25, 2007), which are hereby incorporated by reference.

The skin membrane of a flight vehicle is a good example of naturally formed, non-cooperative reflective acousto-optic modulator. The skin membrane forms a microphone diaphragm with a remote optical readout. Local acoustic sources such as vibrations and flutter cause weak mechanical deformations of the AOM membrane. When properly illuminated by the Sun, lasers, searchlights, landing lights or other illumination sources, the reflective AOM produces a bright specular reflection (glint) that is remotely observable from a long distance. The RAS receiver senses the weak optical intensity fluctuations to recover the distant audio signal. Aerospace flight vehicles frequently produce multiple spatially separated glints. Each glint can serve as a separate microphone to produce stereophonic or multichannel audio. There are also many terrestrial AOM/RAS examples. Id.

Reflective acousto-optic modulation may also result from spinning propellers, rotors, rotodomes, turbines and other rapidly moving devices on the flight vehicle. These rotary devices either mechanically chop the light at audio rates or cause glints to move across the surfaces of the rotary device such as a shaped aircraft propeller.

Refractive Acousto-Optic Modulator (AOM)

The wake turbulence of a moving vehicle can be observed acoustically as it passes in front of a glint illuminated by the Sun, a flight vehicle landing light or other source. In this case the acousto-optic modulation mechanism is refractive, the result of atmospheric refractivity variations produced by the vehicle wake. Sound waves are propagating pressure waves within a fluid such as the atmosphere. Localized acoustic pressure variations cause corresponding optical refractivity variations as a consequence of the ideal gas law. This phenomenology is also exploited by Schlieren cameras that form images of the atmospheric density variations. Naturally formed non cooperative refractive AOMs in front of glints are generally associated with vehicle aerodynamic wake turbulence or as an unwanted noise source in the form of the intervening turbulent atmospheric propagation path to the RAS receiver. Practical experience has shown that wake turbulence modulating solar glints on aircraft and rocket vehicles does produce RAS observable audio.

Acoustically Modulated Emitter (AME)

Large rocket engines along with their exhaust plumes are powerful acoustically modulated optical emitters. The RAS audio is somewhat similar to typical rocket sounds but with region specific variations. It appears that the acousto-optic modulation results from a combination of combustion flow turbulence, instabilities, pressure variations and shock waves. It is thought that main engine throttling and partial stage shutdowns should be readily detectable but so far this has only been partially demonstrated. Spatially scanned multichannel optical RAS data obtained during a recent Atlas V rocket launch shows that the plume audio frequency spectrum and amplitude both shift downward through the plume with increasing distance from the rocket. Future RAS tests with smaller field of view multichannel and multi-wavelength sensors will be used to better localize the AME locations and understand the associated physics. Main rocket engine start and stop sequences have been observed for several different rocket vehicles and have consistently produced detailed and interesting RAS observable transient audio phenomena.

The smaller rocket attitude control thrusters likely produce similar rocket engine signatures but with lower signal intensities and pulse train start/stop sequences. Fireworks have been observed and typically produce pop and sizzle sounds. It is believed that an exoatmospheric entry by a spacecraft or meteor would likely produce similar sounds. Another AME acoustic source is an aircraft landing light with a vibrating filament.

AME involves two propagation paths; the acoustic source to the AME and the AME optical path to the RAS receiver. Often the AME and acoustic source is coincident requiring only the optical free space propagation path to the receiver.

Electro-Optic Modulator (EOM)

An EOM is an electrically modulated glint or retro reflector. Two free space propagation paths are required, illumination to the EOM, and the EOM to the RAS receiver.

Cooperative laser illuminated passive modulated retroreflector data links fall into this category.

Electrically Modulated Emitter (EME)

These are various forms of intensity modulated lights, typically Xenon beacons, aircraft landing lights and modulated LEDs. Only a single free space propagation path is required; the EME to the RAS receiver. These are not known to have been observed on rocket vehicles.

Combinations of RAS Modulation Mechanisms

Audio frequency modulated emissions from the flight vehicle are the spatially distributed linear combinations of the modulated emissions modified by various additive and multiplicative noise sources. Daytime unpowered rocket flight is primarily refractive AOM with the audio resulting from vehicle wake turbulence corrupted by the atmospheric turbulence in the optical propagation path. Powered rocket flight adds strong sound levels from AME combustion turbulence flow and engine transient events.

Combinations of AOM (vibrations, wake turbulence, propellers and rotors) and EME (beacons and other lights) are commonly heard on conventional aircraft. Aircraft night flights are predominantly EME due to the lack of solar glint illumination although vehicle lights can also produce usable AOM audio modulated glints. Aircraft using propellers or rotors produce AOM sounds from modulated glints and reflectivity variations of the rotary components. Pyrotechnics, fireworks and exoatmospheric reentry phenomena produce AME acoustic emissions.

transponder antenna carried by the rocket), an airplane (in this illustrated example—the curved wing and body sections of the airplane, the flashing beacon and landing light of the airplane, the rotating propeller of the airplane, and the radio transponder antenna carried by the rocket), and additionally a race car (in this illustrated example—the curved body sections and cockpit of the race car, and the brake light and exhaust port of the race car), pyrotechnics, and a UFO. Each individual glint or emitter has the potential to form an individual spatially separated RAS microphone and transmitter.

Figure 8:
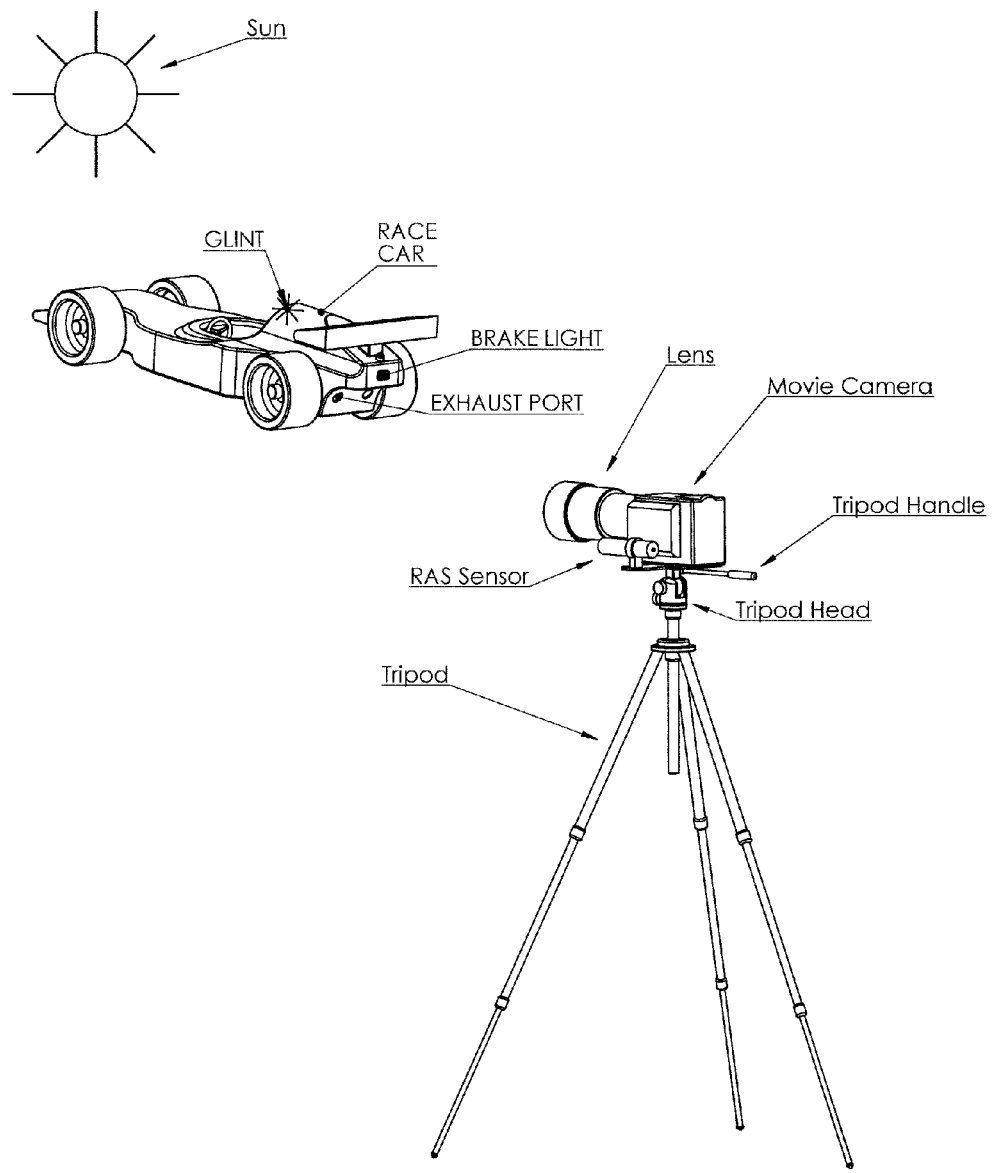
FIG. 8 is an illustration depicting an example monophonic RAS sound camera implementation.
Figure 9:
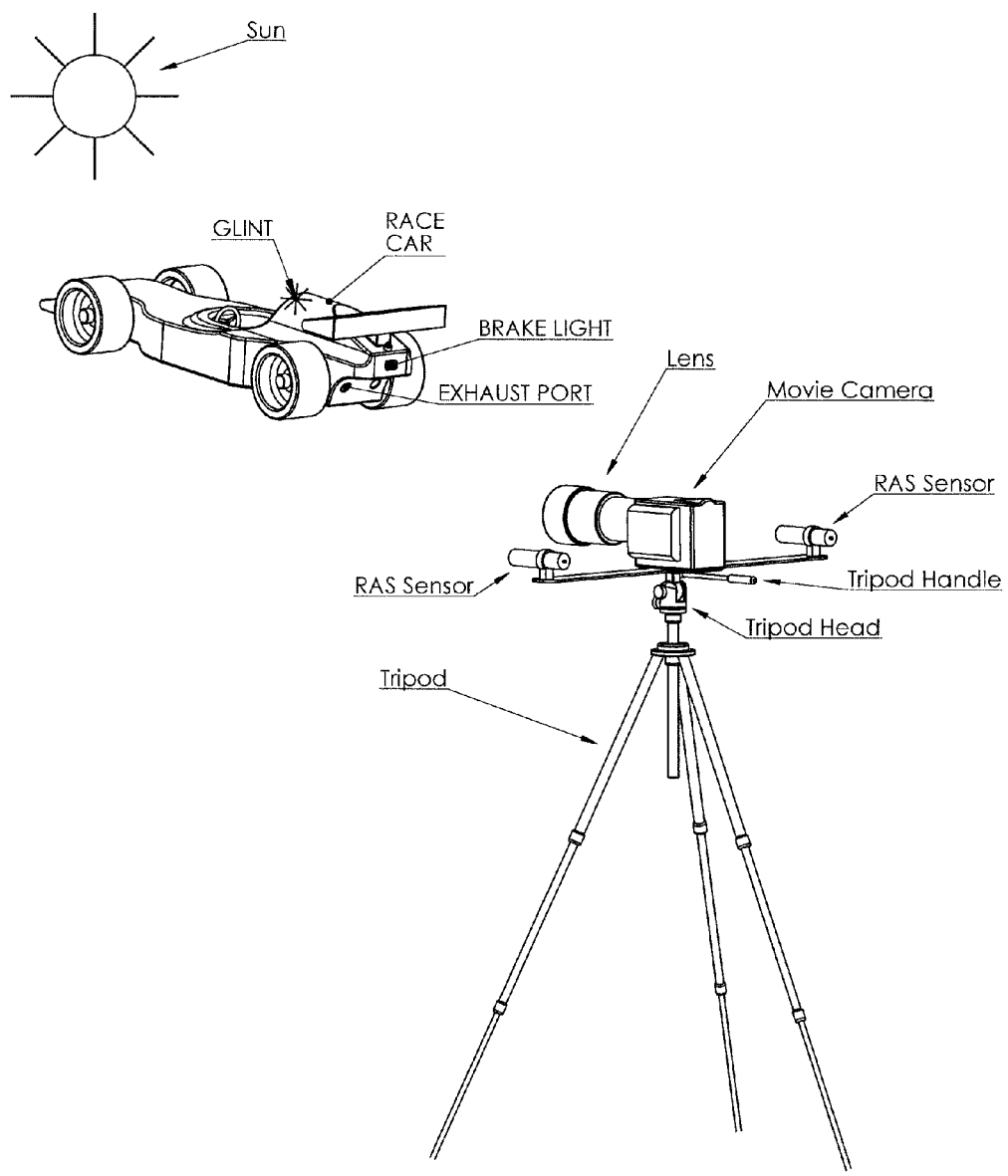
FIG. 9 is an illustration depicting an example stereophonic RAS sound camera implementation.
Figure 10:
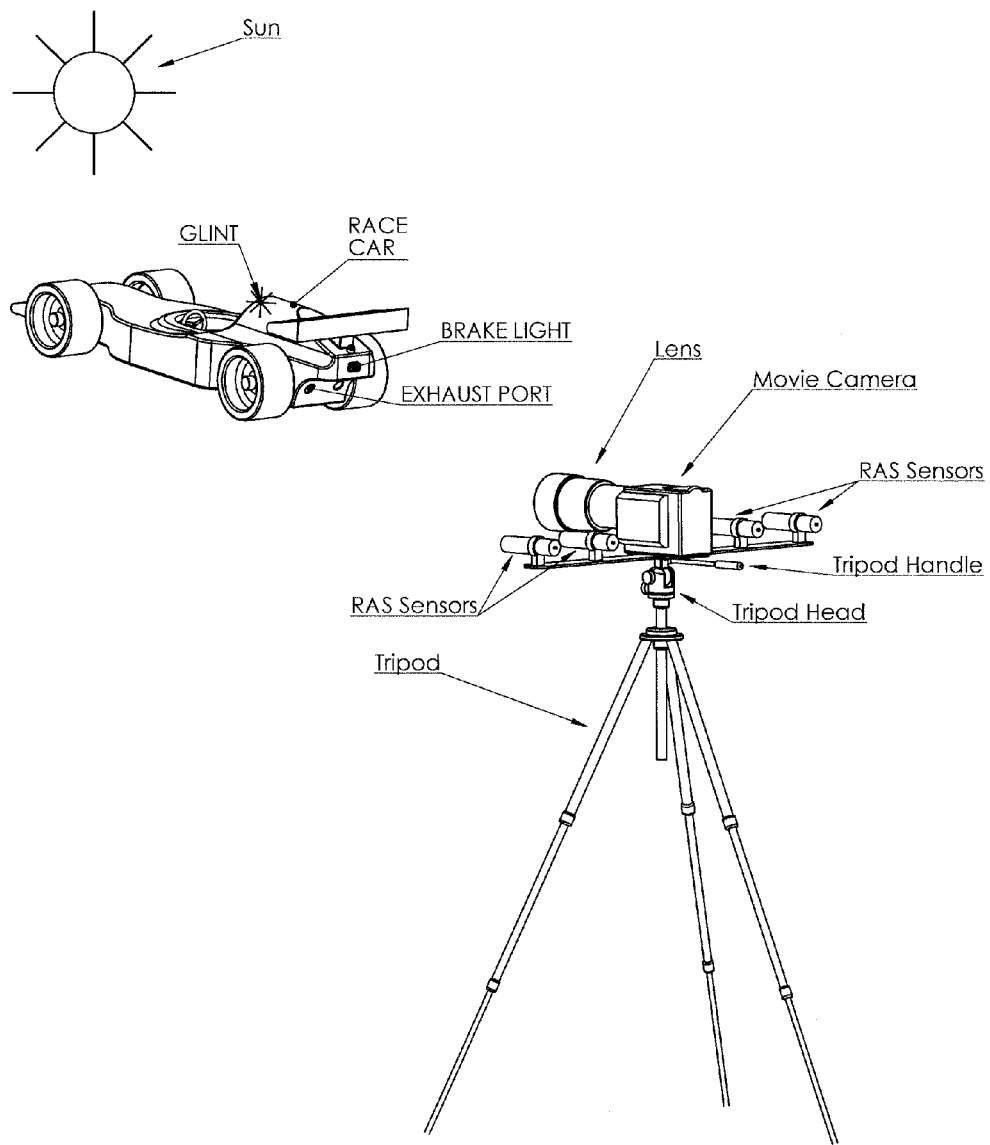
FIG. 10 is an illustration depicting an example multichannel RAS sound camera implementation.

FIGS. 8, 9 and 10 respectively show example monophonic, stereophonic and multichannel RAS sound camera implementations. Stereophonic sound requires the addition of a second RAS detector that observes a second spatially separated AOM or optical emitter. Either a pair of telescopes can be used or a single telescope can be used with a spatially sensitive photodetector. Acoustic intensity provides a stereophonic amplitude localization cue. Acoustic source propagation delays to the different AOM or AME regions produce stereophonic time delay localization cues. Other types of RAS stereophonic sound sensing are possible using different RAS field of views, observing locations, spectral regions or optical polarizations.

Stereophonic RAS can be readily extended to multichannel sound recording and acoustic beam forming by adding additional RAS detector channels. See: Dan Slater, "Passive long range acousto-optic sensor", Proc. SPIE 6304, Free-

TABLE 1

Flight vehicle optical RAS modulation mechanisms

| Type | Links | Type | Illumination | Examples |
|---|---|---|---|---|
| AOM | 3 | Reflective acousto-optic modulator | Solar, laser, other | Vehicle skin membranes, rotating devices |
| AOM | 3 | Refractive acousto-optic modulator | Solar, laser, other | Atmospheric turbulence (vehicle or propagation path) |
| AME | 2 | Acoustically modulated optical emitter | Self luminous | Rocket plumes, thrusters, exoatmospheric reentry |
| EOM | 2 | Electro-optic modulator | Laser | Modulated retroreflector |
| EME | 1 | Electrically modulated optical emitter | Self luminous | Xenon beacons, landing lights, modulated LEDs |

Noise and Sensitivity in Remote Acoustic Sensing (RAS) Systems

RAS noise sources and sensitivity will only be briefly discussed here. The primary noise sources fall into two categories; additive and multiplicative. Additive thermal and shot noise occurs in the RAS detector and limits the sensitivity to weak audio signals. Multiplicative noise results when the Kolmogorov atmospheric turbulence refractivity cascade modulates optical path between the acousto-optic emitter and RAS detector.

Stereophonic and Multichannel Remote Acoustic Sensing (RAS)

The scene frequently includes multiple spatially dispersed acousto-optic emitters. Examples include the numerous simultaneously visible automobile windshield glints in a parking lot, an array of building windows and even the wave driven glints on the ocean surface. In the case of aerospace vehicles, multiple glints occur on engine nacelles, curved wing and body sections, cockpits, and other shiny rounded surfaces. See FIGS. 6 and 7 which show illuminated and/or luminous surfaces/portions of a rocket (in this illustrated example—the curved payload and other body sections of the rocket, the rocket engine, the rocket plume, and the radio Space Laser Communications VI, 63040E (Sep. 1, 2006); Dan Slater, "Passive long range acoustic sensor", U.S. Pat. No. 7,551,519 (Jun. 23, 2009). One interesting implementation option is a high frame rate camera with a sample rate sufficient for the desired audio bandwidth. Each pixel then corresponds to a separate RAS detector. The camera would typically need to operate >5000 frames per second to provide an adequate audio bandwidth while being sensitive to weak optical modulation levels. If this camera is also high resolution, it could simultaneously produce the visual component. This type of camera is currently quite expensive but cost will likely continue to fall in the future. At the other extreme, a very cost effective multichannel RAS detector is an optical flow sensor.

Optical Remote Acoustic Sensing Hardware

In example implementations inclusive of but not limited to long range (far distance) acoustic sensing, an optical RAS receiver may consist of a telescope, a photo detector and the associated support electronics. The RAS telescope aperture and focal length are a function of the illumination, the object being viewed, the viewing distance, atmospheric conditions and detector characteristics. Small wide angle and fisheye RAS detectors can be useful as acquisition aids but most RAS detectors are telescopic. Practical RAS telescope apertures have ranged in size from less than 5 cm (2 inches) to more than 45 cm (18 inches). The larger telescope apertures provide advantages of improved low light sensitivity and reduction of optical scintillation by aperture averaging. Scintillation noise is further reduced by operating at longer wavelengths. The RAS receiver can share the imaging telescope aperture or use one or more separate apertures. The shared aperture simplifies targeting and boresight alignment. The separate RAS aperture(s) simplify the imaging optical path.

The RAS detector measures weak optical intensity fluctuations that are often masked by the bright background illumination. Additionally, the RAS system should have a very wide dynamic range and high sensitivity. The detector output is passed to a signal processor which provides amplification, filtering and other functions.

Specular Probes

RAS is a subset of a more general type of remote sensing based on the concept of specular probes. A specular probe is a distant glinting object that is optically modulated by the local probe environment. See Dan Slater and Sandy Shaw, "Remote sensing with passive specular probes", Proc. SPIE 6709, Free-Space Laser Communications VII, 67090W (Sep. 25, 2007). Remotely observable quantities include radiance, wavelength, directivity and polarization, all of which may be spatially and temporally varying. In example implementations, optical RAS only considers the temporal and spatial audio frequency amplitude modulation of a specular probe.

Radioacoustic Sensing with Passive Doppler Radar

The optical remote acoustic sensor detects audio frequency modulations of vehicle glints and self-luminosity. The same concept applies to other parts of the electromagnetic spectrum including radio frequencies. RF RAS requires a radio wave illumination source, radioacoustic modulation (RAM) and a radio wave receiver.

Flight Vehicle Audio Frequency Modulation of Radio Sources

There are RF analogs of the optical AOM, AME, EOM and EME modulation mechanisms. With reference to "Table 2: Flight vehicle radioacoustic modulation mechanisms" (see below), RAM and RAME are externally and vehicle RF illuminated radioacoustic modulators that correspond to optical AOM and EOM. Radioelectric modulation using vehicle RF carriers (REME) corresponds to normally occurring vehicle transmissions that include non-acoustic, audio frequency components. As in the case of the optical domain, RF specular probes sensitive to parameters other than audio frequency modulations are also possible. Id.

Radioacoustic Modulation (RAM) of Ambient Radio Illumination Sources

The RF equivalent to acousto-optic modulation (AOM) is reflective and refractive radioacoustic modulation (RAM). RF remote acoustic sensing is conceptually related to the radioacoustic sounding system (RASS) methods used for remote measurement of atmospheric vertical temperature profiles and aircraft wake turbulence. See P. Dekker and S. Fraiser, "Radio Acoustic Sounding with a UHF Volume Imaging Radar", Journal of Atmospheric and Ocean Technology, vol. 21 (2003); J. Hanson and F. Marcotte, "Aircraft Wake Vortex Detection Using Continuous-Wave Radar", Johns Hopkins APL Technical Digest, vol. 18, num. 3 (1997), which are hereby incorporated by reference. RASS consists of (or utilizes) a CW or pulsed bistatic radar along with a pulsed or CW acoustic source that view a common atmospheric region. The acoustic source frequency is selected to produce a Bragg grating that effectively reflects the microwave energy. Measurements of the acoustically induced RF Doppler shift produce a measurement of the acoustic propagation speed which is a function of atmospheric temperature.

For the aerospace vehicle radioacoustic sensing experiment, television broadcast signals were used as the transmitter, the vehicle and plume formed the radioacoustic modulator (RAM) and passive Doppler radar receivers are believed to be suitable in relation to a process of detecting acoustically modulated vehicle echoes and extracting the micro-Doppler audio modulation components from vehicle radar echoes received.

Radioacoustic Modulation of Vehicle Carried Radio Emitter (RAME)

The RF equivalent of an acoustically modulated optical emitter (AME) is a radioacoustic modulated emitter (RAME). The radio wave illumination source may be a vehicle carried radio transmitter that includes a CW spectral component. Rocket plume attenuation of rocket telemetry, beacon and other RF sources is a well-known phenomenon. See Anon, "Terminology and Assessment Methods of Solid Propellant Rocket Exhaust Signatures", AGARD Advisory Report AR-287 (1993), which is hereby incorporated by reference. Associated with the plume attenuation is the introduction of noise. See R. Lee, et. al., "Studies of Plasma Properties in Rocket Plumes", Aerospace Corporation Report SD-TR82-44 (1982), which is hereby incorporated by reference. This is the result of a multiplicative modulation of the RF signal by the turbulent plume.

Radioelectric Modulation (REM)

The nearest RF equivalent to electro-optic modulation (EOM) is a modulated radar retroreflector or radar beacon transponder.

Radioelectric Modulated Radio Emitter (REME)

The RF equivalent to an electrically modulated optical emitter (EME) is a radio transmitter that includes audio frequency modulation components. These are plentiful on aerospace vehicles as the normal voice, telemetry and other radio transmissions.

Combinations of Optical and Radio Wave Remote Acoustic Sensing

Optical and RF RAS methods can be used simultaneously. Audio frequency modulated emissions from the flight vehicle are the spatially distributed linear combinations of the modulated emissions modified by various additive and multiplicative noise sources. There are two significant differences between optical and RF RAS. Optical RAS is limited to intensity measurements whereas RF RAS can use both intensity and RF phase information. The second difference is that RF RAS detectors generally do not have sufficient angular resolution to detect spatially separated stereophonic signals on the flight vehicle. Other types of RF stereophonic listening are possible including multiple transmit and receive sites, RF frequency, polarization, etc.

TABLE 2

Flight vehicle radioacoustic modulation mechanisms

| Optical | RF | Links | Type | Illumination | Examples |
|---|---|---|---|---|---|
| AOM | RAM | 3 | Reflective radioacoustic modulator | RF transmitter | Vehicle skin membranes, rotating devices |
| AOM | RAM | 3 | Refractive radioacoustic modulator | RF transmitter | Rocket flame attenuation & scattering |
| AME | RAME | 2 | Radioacoustic modulated emitter | Vehicle RF transmitter | Rocket flame attenuation, vehicle voice transmissions |
| EOM | REM | 2 | Radioelectric modulator | Distant radar transmitter | Radar beacon transponder |
| EME | REME | 1 | Radioelectric modulated emitter | Vehicle RF transmitter | Vehicle telemetry and other radio transmissions |

Passive Multistatic Radar

Several experimental passive VHF & UHF Doppler radars were built in an attempt to detect vehicle induced audio frequency modulations. Radar echoes have been consistently received from flight vehicles, and are believed to be suitable in respect to envisioned implementations involving and/or facilitating long range RF based vehicle remote acoustic sensing.

In an example experimental radar, two independent passive multistatic CW Doppler radars were utilized. Both radars provided multistatic velocity information but no range information. Both passive Doppler radars used constant frequency, constant amplitude ATSC pilot signals produced by existing VHF and UHF broadcast television transmitters to illuminate the flight vehicle. The use of preexisting radio transmissions eliminated the need to provide any radar transmitting hardware along with the associated FCC frequency allocation and licensing issues.

Television broadcast signals typically follow several different propagation paths to a radar receiver. The direct path from the transmitter to the receiver is the most common but is not always present due to terrain blockage. The direct path signal appears at a constant frequency in the radar spectrum display and can be used to produce a phase reference. The radar propagation path of most interest is a bistatic path, first from the television broadcast transmitter to the flight vehicle and then scattered energy from the flight vehicle to the radar receiver. The flight vehicle motion causes a Doppler frequency shift corresponding to the changing bistatic path length.

Geographically distributed ATSC television transmitters serving different communities often share the same television broadcast channel producing several closely spaced pilot signals. The geographic separation and terrain blockage are sufficient to prevent terrestrial co-channel interference. High altitude flight vehicles are often illuminated simultaneously by several geographically distributed television transmitters resulting in multiple bistatic radar returns. Different frequency shifts are observed for each bistatic path because of the differing bistatic geometries resulting in a multistatic radar system.

Rockets moving at high speeds produce large Doppler frequency shifts. Aircraft produce similar signatures but with much smaller Doppler frequency shifts. In relation to observing a launch event for example, broadcast television transmitters in multiple different locations (e.g., in three different cities) can be utilized and radar receivers collocated with a telescopic sound camera in another location (e.g., in a fourth city).

Differential vehicle motion, vehicle vibrations and acoustic energy all produce a spectral broadening of the Doppler signal, sometimes called micro-Doppler. The differential vehicle motion can be used to produce vehicle images using inverse synthetic aperture radar (ISAR) techniques. Remote Acoustic Sensing (RAS) using RF illuminated glints is believed to be suitable for implementation by and/or utilizing amplitude, phase or other demodulation. Multistatic radar geometries require additional processing to separate the geometries that correspond to different stereophonic or multi-channel audio signals.

Passive Multistatic Radar Hardware

A passive multistatic Doppler radar can be implemented with little more than a suitable antenna, a low cost Software Defined Radio (SDR) receiver and appropriate software. Better performance requires better hardware with high gain antennas, higher sensitivity and advanced signal processing. In some implementations or environments (e.g., such as those involving a flight vehicle), suitable radars operate, for example, in the VHF and UHF television broadcast spectrum.

The sensitivity of the radar can be analyzed using standard bistatic radar equations. The ATSC transmission includes the actual television signal which appears as broadband noise about 50 dBc below the pilot signal level when using a 1 Hz bandwidth. The SNR is decreased when multiple ATSC transmitters are contributing to the vehicle Doppler signal due to the broad band data signal. In other example and/or contemplated implementations, the main television signal can be used to obtain range information and further improve the radar sensitivity.

Referring to FIG. 1B and as previously indicated, example embodiments described herein involve or facilitate providing a listening device or system (e.g., such as described herein) to an element 200, which can include one or more device(s) and/or system(s) (e.g., such as one or more of the devices or systems referenced herein). In FIG. 1B, the image capturing device(s) 202 is(are) depicted with dashed/broken lines symbolizing that some example embodiments of the present invention do not include or utilize an image capturing device. The image capturing device(s) 202 additionally is(are) depicted (in FIG. 1B) with solid lines symbolizing that some example embodiments of the present invention do include or utilize an image capturing device. In example embodiments and implementations (e.g., those in which the element 200 includes or utilizes one or more image capturing devices), the image capturing device(s) 202 and the AFMS device(s) 204 include or utilize independent sensors (or detectors), and the electronics and/or processor(s) 206 include electronics associated with one or more of the image capturing device(s) 202 and the AFMS device(s) 204. In example embodiments and implementations, the element 200 also includes or operatively interfaces with a communications interface, I/O 208, user input mechanism(s) 210, and/or or database(s) 212.

In example embodiments and implementations, the image capturing device(s) 202 and the AFMS device(s) 204 and associated electronics are adapted to capture images of one or more illuminated and/or luminous objects 110 and to obtain audio frequency modulated electromagnetic energy utilizing (sensors of) the AFMS device(s) 204 and in time synchronization with images captured by the image capturing device(s) 202, and such that the image capturing device(s) 202 and the AFMS device(s) 204 provide viewing and listening (outputs), respectively, the listening output including signals and/or information indicating or providing a representation of a disturbance to an electromagnetic field or fields at or associated with at least one of the one or more objects, the disturbance being or including an audio frequency modulation of a signal from or associated with (e.g., received from) at least one of the one or more objects.

In example embodiments and implementations, and with reference also to FIG. 1A (as applicable), the AFMS device 104, or AFMS device(s) 204, can include one or more (time synchronized) optically based audio frequency modulation sensors. The AFMS device(s) 104, 204 can include or utilize, for example, a Model 2001 photoreceiver commercially available from Newport Corporation of Irvine, Calif. In example embodiments and implementations, the AFMS device 104, or AFMS device(s) 204, can include one or more (time synchronized) RF based sensing devices. The AFMS device(s) 104, 204 can include or utilize, for example, UHF radar consisting of a 400 MHz to 1000 MHz log periodic antenna as input to a FunCube Dongle+SDR receiver connected to and controlled by a laptop computer. In example and envisioned embodiments or implementations, the AFMS device(s) 104, 204 includes one or more optical detectors, one or more radio frequency (RF) detectors, or a combination of optical and RF detectors. Other sensors or detectors can also be utilized.

In some embodiments and implementations, the electronics and/or processor(s) 106, 206 are adapted (e.g., programmed) to obtain audio frequency modulated electromagnetic energy from images captured by (or otherwise obtained utilizing) sensors of the AFMS device(s) 104, 204 and in time synchronization with images captured by the image capturing device(s) 102, 202. In some embodiments and implementations, the AFMS device(s) 104, 204 is adapted to sense audio frequency (and/or radioacoustic) modulated signal(s) from or associated with (e.g., received from) one or more illuminated and/or luminous object(s) and/or nearby vicinity 110. In example embodiments and implementations, one or more objects sensed by the AFMS device(s) 104, 204 are illuminated by an illumination source 112 (ambient optical, microwave or radio wave electromagnetic energy) and/or are self-luminous. The listening (e.g., audio) output including signals and/or information indicating or providing a representation of a disturbance (e.g., audio frequency or radioacoustic modulation), effected by an acoustic or vibration source and/or direct electrical modulation (or radioacoustic modulation) 114, to an electromagnetic field or fields at or associated with at least one of the one or more objects.

In example embodiments and implementations, the electronics and/or processor(s) 106, 206 are adapted to extract the signals and/or information from images captured only by the AFMS device(s) 104, 204. One or more techniques can be utilized (to extract or otherwise obtain the signals and/or information) involving, for example, amplitude demodulation of optical or RF signals. In this case, the audio frequency modulation changes the intensity of the optical or RF signal as would be caused by the changing curvature (gain) of a vibrating membrane. The audio signal is recovered by detecting the received optical or RF power. Another approach, one that is used in ISAR and micro-Doppler, is to look at the RF phase or frequency modulation independent of the received signal power. Audio frequency phase modulation is the result of changes in the RF path length at audio rates, such as would be caused by a radio wave reflecting from a vibrating surface. The signal can be phase demodulated in a number of ways such as those which would be known and understood by one of skill in the art and/or that are described in published technical literature. Other techniques and implementation particulars can be utilized as appropriate, such as those described in Dan Slater, "Passive Long Range Acoustic Sensor", U.S. Pat. No. 7,551,519 (Jun. 23, 2009), which is incorporated herein by reference in its entirety. In example implementations, the audio output generated by the electronics and/or processor(s) 106 includes audio modulation components extracted from signals received from or associated with at least one illuminated and/or luminous object(s) and/or nearby vicinity.

Thus, in example embodiments and implementations, a device for obtaining or providing listening includes: an image capturing device capable of capturing images of illuminated and/or luminous objects, including an object that is illuminated by ambient optical, microwave or radio wave electromagnetic energy and/or self-luminous, and an electromagnetic signal (energy) detection-facilitated audio frequency modulation sensing (AFMS) device having separate independent sensors, said devices and associated electronics being adapted to capture images of one or more illuminated and/or luminous objects and to obtain audio frequency modulated electromagnetic energy utilizing sensors of said AFMS device, and to generate or facilitate providing a listening output of the AFMS device (e.g., an audio signal) in time synchronization with a viewing output (e.g., video signal) including or utilizing images of said one or more objects captured by said image capturing device, the listening output including signals and/or information indicating or providing a representation of a disturbance to an electromagnetic field or fields at or associated with at least one of said one or more objects, the disturbance being or including an audio frequency modulation of a signal from or associated with (e.g., received from) at least one of said one or more objects.

In example embodiments and implementations, at least one of said separate independent sensors is optically based. In other example embodiments and implementations, at least one of said separate independent sensors implements or is adapted to utilize one or more radio frequency (RF) demodulation or detection technologies. The AFMS device can include, for example, one or more optically based audio frequency modulation sensors. In example embodiments and implementations, the AFMS device includes multiple (e.g., optical) detectors with spatially separated views, said AFMS device and associated electronics being adapted to facilitate stereophonic or multichannel audio frequency sensing. In example embodiments and implementations, the AFMS device includes multiple detectors with observing site separation, polarization separation or wavelength separation, said AFMS device and associated electronics being adapted to facilitate stereophonic or multichannel sound sensing. In example embodiments and implementations, the AFMS device includes multiple radio frequency (RF) receivers with observing site separation, said AFMS device and associated electronics being adapted to facilitate stereophonic or multichannel sound sensing. In example embodiments and implementations, the AFMS device includes one or more optical detectors with or adapted to provide polarization separation, said AFMS device and associated electronics being adapted to facilitate stereophonic or multichannel sound sensing. In example embodiments and implementations, the AFMS device includes one or more radio frequency (RF) detectors with or adapted to provide polarization separation (e.g., vertical and horizontal polarization), the AFMS device and associated electronics being adapted to facilitate stereophonic or multichannel sound sensing.

The one or more illuminated and/or luminous objects include, for example, an object (or a portion of an object) that is illuminated by ambient optical, microwave or radio wave electromagnetic energy and/or self-luminous. In example embodiments and implementations, the one or more illuminated and/or luminous objects include an object (or a portion of an object) that is self-fluctuating. The one or more illuminated and/or luminous objects include, by way of example, an object (or a portion of an object) that is an emissive object, a glinting object, or a combination thereof. In example embodiments and implementations, the one or more illuminated and/or luminous objects include one or more portions of a rocket, a spacecraft, or other (man-made) vehicle.

The disturbance can include an audio frequency modulation of a local optical or radio frequency environment in relation to at least one of said one or more objects. By way of example, the disturbance includes audio frequency modulations of local optical and radio frequency environments in relation to said one or more objects. In example embodiments and implementations, the disturbance includes an audio frequency modulation of an optical illumination source. In example embodiments and implementations, the disturbance includes an audio frequency modulation of the luminosity of at least one of said one or more objects and/or nearby vicinity in relation to said object(s). In example embodiments and implementations, the disturbance includes an audio frequency modulation of the intensity of an optical signal from or associated with (e.g., received from) at least one of said one or more objects. In example embodiments and implementations, the disturbance is or includes an audio frequency modulation resulting from one or more of: an acoustic source, a vibration source, and a direct electrical modulation. In example embodiments and implementations, the disturbance is or includes an audio frequency modulation resulting from one or more of: an acoustic or vibration source and a direct electrical modulation. By way of example, the disturbance is or includes an audio frequency modulation resulting from an acoustic or vibration source, or from a direct electrical modulation. In example embodiments and implementations, the disturbance is or includes an acoustic or vibration modulation of a signal from or associated with (e.g., received from) at least one of said one or more objects. In example embodiments and implementations, the disturbance is or includes an audio frequency non-acoustic modulation of a signal from or associated with (e.g., received from) at least one of said one or more objects. In example embodiments and implementations, the disturbance further includes a radioacoustic modulation of a radio wave illumination source. By way of example, the disturbance further includes a radioacoustic modulation of a (modulated) luminance mechanism associated with at least one of said one or more objects. In example embodiments and implementations, the disturbance (e.g., radioacoustic modulation) causes a spectral broadening of a Doppler signal from or associated with (e.g., echoed from) at least one of said one or more objects. In example embodiments and implementations, the disturbance further comprises one or more of a phase modulation and a frequency modulation of a radio frequency (RF) signal. In example embodiments and implementations, the disturbance (further) includes an audio frequency and/or phase modulation of a signal from or associated with (e.g., received from) at least one of said one or more objects.

In example embodiments and implementations, the element 200 (e.g., a sound camera) includes (and/or utilizes) electronics and/or processor(s) adapted to extract said signals and/or information from images (of at least one of said one or more objects) captured by one or more of the image capturing device and the AFMS device, or alternately, the electronics are adapted to extract said signals and/or information from energy sensed (e.g., images captured) only by the AFMS device. In example embodiments and implementations, one or more of the image capturing device and the AFMS device is or includes one or more sensors, transducers, and/or other mechanisms responsive to energy in the optical and/or radio frequency electromagnetic spectral regions. By way of example, one or more of the image capturing device and the AFMS device includes or is adapted to utilize optical and/or radio wave detectors. In example embodiments and implementations, one or more of the image capturing device and the AFMS device includes or is adapted to utilize one or more sensing technologies that operate in optical and/or radio frequency electromagnetic spectral regions.

In example embodiments and implementations, one or more of the image capturing device and the AFMS device includes or is adapted to simultaneously utilize radio frequency (RF) and optical AFMS sensing techniques.

In example embodiments and implementations, one or more of the image capturing device and the AFMS device includes multiple sensors adapted to detect (or sense) spatiotemporal audio frequency amplitude modulations in (optical) signals from or associated with (e.g., received from) at least one of said one or more objects.

In example embodiments and implementations, one or more of the image capturing device and the AFMS device is adapted to detect (or sense) observable quantities including one or more of radiance, wavelength, directivity and polarization in signals from or associated with (e.g., received from) at least one of said one or more objects.

In example embodiments and implementations, one or more of the image capturing device and the AFMS device is adapted to detect (or sense) polarization in optical signals from or associated with (e.g., received from) at least one of said one or more objects. By way of example, one or more of the image capturing device and the AFMS device is adapted to detect (or sense) polarization (e.g., vertical and horizontal polarization) in radio frequency (RF) signals from or associated with (e.g., received from) at least one of said one or more objects.

In example embodiments and implementations, one or more of the image capturing device and the AFMS device includes or is adapted to utilize multiple sensors adapted to facilitate multichannel sound recording and/or acoustic beam forming (in relation to at least one of said one or more objects).

In example embodiments and implementations, one or more of the image capturing device, the AFMS device, and the associated electronics includes or is adapted to utilize an antenna and/or a radio receiver. In example embodiments and implementations, the image capturing device (and/or associated electronics) is adapted to utilize radar signals (e.g., echoes) from or associated with (e.g., received from) at least one of said one or more objects and (one or more) inverse synthetic aperture radar (ISAR) techniques to produce images (e.g., vehicle images). In example embodiments and implementations, the image capturing device (and/or associated electronics) is adapted to (receive/detect/) utilize radar signals (e.g., echoes) including or providing information involving detected differential (e.g., vehicle) motion to provide or facilitate generation of images (e.g., vehicle images).

As previously indicated, one or more sensing devices (e.g., AFMS device(s) such as described herein) can be used to generate or facilitate providing a listening output.

Thus, in example embodiments and implementations, a method for obtaining or providing listening includes: utilizing one or more sensing devices (e.g., electromagnetic signal (energy) detection-facilitated audio frequency modulation sensing (AFMS) devices) to detect or obtain audio frequency modulated signals received from or associated with one or more illuminated and/or luminous objects; and generating or providing a listening output of the sensing device(s) (e.g., an audio signal), the listening output including signals and/or information indicating or providing a representation of a disturbance to an electromagnetic field or fields at or associated with at least one of said one or more objects, the disturbance being or including an audio frequency modulation of a signal from or associated with (e.g., received from) at least one of said one or more objects.

In example embodiments and implementations, the listening output facilitates, controls, or initiates an action or process of presenting, reproducing, transmitting, or otherwise communicating or making accessible the listening content. The listening output includes, for example, single or multichannel listening content. In a method for obtaining or providing listening, a listening output is generated or provided, for example, utilizing one or more audio monitors or speakers (to present or reproduce the listening output) or a pair of headphone (e.g., to generate multichannel listening content provided by RF RAS devices).

In example embodiments and implementations, a method for obtaining or providing listening includes utilizing one or more indicator devices to generate human (or machine) perceivable aural, visual and/or vibration outputs responsive to or determined from the listening output. In a method for obtaining or providing listening, a listening output is generated or provided, for example, utilizing an indicator device of a safety or assistive device (within which the sensor(s) are located in some implementations) to generate aural, visual and/or vibration outputs responsive to or determined from the listening output or detection thereof. By way of example, the safety or assistive device can include a vibration mechanism operatively connected to a controller that generates a vibration actuation signal or the like responsive to the listening output.

In an example method for obtaining or providing listening, an action or process of generating or providing a listening output includes facilitating an aural sensory input utilizing one or more of the following devices: headphones, earbuds, a hearing aid, a car stereo, a radio, a personal communications and/or computing device, a smartphone, a wearable technology item, a wristwatch, or a media presentation device. (See also FIGS. 6 and 7.) In example embodiments and implementations, the audio frequency modulated signals (detected or obtained by said sensing device(s)) include electromagnetic energy in the radio frequency (RF) spectral region. In example embodiments and implementations, the audio frequency modulated signals (detected or obtained by said sensing device(s)) include electromagnetic energy in multiple different (e.g., optical and radio frequency) electromagnetic spectral regions.

Example embodiments described herein involve a device for obtaining or providing listening that includes an element of industry or manufacture, the element including or being adapted to utilize or operatively interface with one or more AFMS devices and/or other sensing devices. The element can be of human or non-human industry or manufacture, and can include devices and systems outside the realm of industry and manufacture. For example, the AFMS device(s) are adapted to obtain audio frequency modulated signals received from or associated with one or more illuminated and/or luminous objects (e.g., including an object that is illuminated by ambient optical, microwave or radio wave electromagnetic energy and/or self-luminous) and the element and AFMS device(s) and associated electronics being adapted to generate or facilitate providing a listening output of the AFMS device(s), the listening output including signals and/or information indicating or providing a representation of a disturbance to an electromagnetic field or fields at or associated with at least one of said one or more objects, the disturbance being or including an audio frequency modulation of a signal from or associated with at least one of said one or more objects.

With reference to FIG. 1B, in example embodiments and implementations, the element 200 (FIG. 1B) includes or is adapted to utilize or operatively interface with the AFMS device(s) 204. In example embodiments and implementations, the element does not include or utilize an optical imaging device. In example embodiments and implementations, the AFMS device(s) include (or consist of) sensing devices that facilitate sensing only in radio frequency (RF) electromagnetic spectral regions. In example embodiments and implementations, the AFMS device(s) include sensing devices that are responsive to and facilitate sensing of energy in multiple different (e.g., optical and radio frequency) electromagnetic spectral regions.

The element 200 can be, for example, a device or system for providing or obtaining viewing and/or listening outputs, signals, or content obtained utilizing an acoustic or vibration sensing device responsive to the movement of air or other molecules. In example embodiments and implementations, the element is a listening device or system, said element 200 and AFMS device(s) 204 and associated electronics being adapted to provide aural capability (e.g., short range aural capability, long range aural capability, or both) in a manner other than, and independent of whether the device or system utilizes, an acoustic or vibration sensing (or detecting) device responsive to the movement of air or other molecules.

In example embodiments and implementations, the element 200 includes or utilizes an optical imaging device adapted to provide or obtain a viewing output.

In example embodiments and implementations, the element 200 is: a device or system for providing, obtaining, utilizing, generating or reproducing sounds (e.g., embodying one or more technologies utilized by musicians, composers, editors, or producers of music or soundtracks, in sound design, or involving audio media or listening outputs, signals, or content in general); a hearing aid or hearing augmentation device or system; a pair of headphones; a wrist watch, head gear, an article of clothing, or wearable technology item or apparel; a personal computing and/or communications device or peripheral device thereof; a warning or detection device or system; or an aircraft or other vehicle detection device or system.

In example embodiments and implementations, the element 200 and the AFMS device(s) 204 and associated electronics are (further) adapted to utilize sensor outputs of said AFMS device(s) to facilitate, control, or initiate an action or process performed by or involving said element. For example, one or more electronic display or other devices and systems can be controlled in relation to effect at least a portion of the action or process.

The action or process (performed by or involving said element) includes, for example: characterizing airflow and atmospheric turbulence (e.g., wind shear); or sensing waves on a self-luminous vibrating liquid surface.

In example embodiments and implementations, the element 200 is an atmospheric seeing monitor and the action or process includes astronomical seeing.

In example embodiments and implementations, the AFMS device(s) 204 include one or more multispectral sensing devices and the action or process includes sensing surfaces or other objects that emit or reflect at different wavelengths.

In example embodiments and implementations, the AFMS device(s) 204 include one or more multispectral sensing devices and the action or process involves sensing (e.g., and utilizing different wavelength filters on two different telescopes respectively) to derive or obtain stereophonic information. Such listening outputs can be provided one to each ear using a pair of RAS headphones, for example, utilizing visible light and shortwave IR channels to provide multispectral stereophonic listening (see also FIG. 6).

In example embodiments and implementations, the AFMS device(s) 204 include one or more multispectral sensing devices and the action or process involves or effects communications (e.g., facilitates a communications function or process such, for example, obtaining or providing stereophonic listening and/or information).

In example embodiments and implementations, the element 200 is a device or system for facilitating or utilizing sensory enhancement and/or sensed feedback and the action or process includes providing at least or only the listening output for and in relation to providing extra-sensory inputs and/or information.

In example embodiments and implementations, the element 200 is a device or system for facilitating or utilizing sensory enhancement and/or sensed feedback and the action or process includes providing extra-sensory inputs and/or information to an operator of a vehicle. For example, early cues to race car drivers pertinent to location and movements of competing drivers' vehicles and/or mode of, or changes in engine, transmission, and other vehicles' components operation.

In example embodiments and implementations, the element 200 is a device or system for facilitating or utilizing sensory enhancement and/or sensed feedback and the action or process includes providing or obtaining a viewing output of said one or more objects, and generating or providing the listening output in time synchronization with the viewing output.

In example embodiments and implementations, the element 200 is a device or system for facilitating or utilizing sensory enhancement and/or sensed feedback and the action or process includes providing at least the listening output for and in relation to locating at least one of said object(s).

In example embodiments and implementations, the element 200 is a device or system for facilitating or utilizing sensory enhancement and/or sensed feedback and the action or process includes providing at least the listening output for and in relation to locating or tracking at least one of said object(s).

In example embodiments and implementations, the element 200 is an object locating and/or tracking device or system, the viewing output being provided by a moveable imaging device, and the action or process includes providing the listening output in conjunction with the viewing output to look for said object(s), the outputs being mutually informing to an operator repositioning the imaging device in search of said object(s) when said object(s) is(are) observable, that is, perceived or perceivable by the operator, from both the viewing output and the listening output. A viewing output is supplemented with a listening output obtained or provided by one or more electromagnetic signal (energy) detection-facilitated audio frequency modulation sensing devices thereby providing an optical-acoustic location device.

In example embodiments and implementations, the element 200 is a laser device or system (e.g., a laser guide star, a laser pointer, or other device or system including or utilizing lasers, for example, to provide a laser light show) and the action or process includes or involves RAS facilitated detection of aircraft and/or other vehicles (e.g., for which there are actual or potential vulnerabilities or concerns in relation to laser exposure) (and, in some implementations, transmitting or otherwise providing a warning to the detected aircraft or other vehicle and/or facilitating, controlling, or initiating other actions or processes to eliminate or decrease the risk of laser exposure).

In example embodiments and implementations, the element 200 is a microwave device or system (e.g., a microwave antenna) and the action or process includes or involves RAS facilitated detection of aircraft and/or other vehicles (e.g., for which there are actual or potential vulnerabilities or concerns in relation to microwave exposure) (and, in some implementations, transmitting or otherwise providing a warning to the detected aircraft or other vehicle and/or facilitating, controlling, or initiating other actions or processes to eliminate or decrease the risk of microwave exposure).

In example embodiments and implementations, the element 200 is a vehicle-based or vehicle-interfaced device or system (e.g., a radio) and the action or process includes utilizing said device or system to provide an indication or warning in relation to: detection of flashing strobes indicating an emergency vehicle; detection of Xenon headlights indicating an approaching vehicle; detection of LED brake lights indicating a decelerating vehicle; detection of alternator or other vehicle component induced modulations of taillights indicating a particular vehicle type or model (e.g., operational characteristics of different types or models of vehicles being identifiable by their respective listening device observable "aural signatures"); or detection of a LED modulation of and indicating that an automatic license-plate recognition (ALPR) camera is in use. (See also FIG. 7.)

As to providing an indication or warning in relation to the ALPR camera being in use, a device or system can be provided or adapted to produce RAS sound responsive to detection (by an acoustic sensor) of a modulation—for example, detection of the 3 level LED modulation in a P372 Spike+ALPR camera, available from PIPS Technology Inc. of Knoxville, Tenn.

In example embodiments and implementations, the element 200 is a safety (or assistive) device or system for visually and/or hearing impaired persons (e.g., a walking cane provided with a RF AFMS device, associated electronics and power source, and an indicator such as for example, a vibration device and/or a speaker or wifi transmitter adapted to generate a warning in the form of one or more indicators suitable for perception by a blind or visually impaired person and, in some implementations, accommodating a person who is hearing impaired as well) and the action or process includes utilizing said device or system to provide an indication or warning in relation to detection of RAS activity in relation to a vehicle (e.g., detection of nearby RAS activity such as shiny spinning hubcaps on cars or flashing beacons on emergency vehicles).

In example embodiments and implementations, the element 200 is a detection or measurement device or system and the action or process includes capturing or otherwise obtaining: aerospace imagery, telescopic imagery, microscopy imagery, diagnostic imagery, medical imagery, meteorological imagery, military imagery, security imagery, or space imagery. By way of example, such a detection or measurement device or system is capable of capturing or otherwise obtaining (and/or adapted to utilize special purpose computers, software, and/or databases that facilitate specialized detection, measurement, and/or analysis functions, features or processes in relation to): aerospace imagery, telescopic imagery, microscopy imagery, diagnostic imagery, medical imagery, meteorological imagery, military imagery, security imagery, or space imagery.

In example embodiments and implementations, the element 200 is: a device or system for providing extra-sensory inputs/information to an operator of a vehicle or a machine; or a device or system providing or facilitating a RAS-enhanced virtual reality experience or other RAS-enhanced observing.

Thus, in example embodiments and implementations, a device for obtaining or providing listening includes (or consists of): an element of (human or non-human) industry or manufacture including or adapted to utilize or operatively interface with one or more electromagnetic signal (energy) detection-facilitated audio frequency modulation sensing (AFMS) devices, said AFMS device(s) being adapted to obtain audio frequency modulated signals received from or associated with one or more illuminated and/or luminous objects (e.g., including an object that is illuminated by ambient optical, microwave or radio wave electromagnetic energy and/or self-luminous), said element and AFMS device(s) and associated electronics being adapted to generate or facilitate providing a listening output of the AFMS device(s), the listening output including signals and/or information indicating or providing a representation of a disturbance to an electromagnetic field or fields at or associated with at least one of said one or more objects, the disturbance being or including an audio frequency modulation of a signal from or associated with at least one of said one or more objects.

Example embodiments described herein involve a method for obtaining or providing listening that includes capturing and/or accessing images (e.g., provided by imaging sensors) of one or more illuminated and/or luminous objects as viewing content, and extracting from other images (provided by one or more separate independent sensors or detectors) signals and/or information facilitating the generation and provision of listening content. In example embodiments and implementations, the method involves sensing utilizing one or more separate independent sensors (or detectors) adapted to obtain audio frequency modulated electromagnetic energy from said other images. The method includes, for example, extracting signals and/or information from said other images, and providing a listening output (e.g., an audio signal) determined from the extracted signals and/or information and a viewing output (e.g., video signal) from or associated with the images.

Thus, in example embodiments and implementations, a method for obtaining or providing listening includes: capturing and/or accessing (e.g., accessing captured) images (e.g., provided by imaging sensors) of one or more illuminated and/or luminous objects (e.g., an object that is illuminated by ambient optical, microwave or radio wave electromagnetic energy and/or self-luminous, or portions of said objects) as viewing content; extracting from other images provided by one or more separate independent sensors (or detectors) adapted to obtain audio frequency modulated electromagnetic energy from said other images signals and/or information facilitating the generation and provision of listening content including an audio representation or indication of a disturbance to an electromagnetic field or fields at or associated with at least one of said one or more objects; and providing a listening output (e.g., an audio signal) determined from the extracted signals and/or information and a viewing output (e.g., video signal) from or associated with the images.

In example embodiments and implementations, the viewing and/or listening outputs (are adapted to) facilitate, control, or initiate an action or process of (or involving) presenting, reproducing, transmitting, or otherwise communicating or making accessible the listening content in time synchronization with the viewing content or one or more portions or images thereof. The listening output includes, for example, single or multichannel listening content time synchronized with said viewing content.

Multiple different "versions" of viewing content (e.g., selections or arrangements of; cuts, edits, revisions or corrections to; visual or special effects or other image processing applied to; coding, metadata or other information added to) can be made or provided from the same sequence, collection or group of captured images. Multiple different viewing outputs can be provided in relation to and/or facilitating access to particular viewing and/or listening content—such as, for example, an output that is required in relation to generating or providing the viewing (and/or listening) content, or a pair of viewing and listening outputs.

In relation to any particular viewing content or output, in some implementations, multiple different "versions" of listening content can or may also be provided. For example, multiple different "versions" of listening content can be made or provided utilizing various selections of (as well as different mixes, filtering, modifications, corrections, mastering, and audio signal processing of and/or coding, metadata or other information added to) sounds and/or other sensed or detected information obtained by one or more of, for example: one or more separate independent sensors (or detectors) adapted to obtain electromagnetically audio frequency modulated electromagnetic energy; one or more electromagnetic signal (energy) detection-facilitated audio frequency modulation sensing (AFMS) devices; an acoustic sensing device that includes or is adapted to utilize optical and/or radio wave detectors; one or more sensors, transducers, and/or other mechanisms responsive to energy in the optical and/or radio frequency electromagnetic spectral regions; one or more sensing technologies that operate in optical and/or radio frequency electromagnetic spectral regions; an acoustic sensing device that includes or is adapted to simultaneously utilize radio frequency (RF) and optical acoustic sensing techniques; one or more acoustic sensing devices responsive to energy in multiple different (e.g., optical and radio frequency) electromagnetic spectral regions; acoustic sensing devices respectively directed toward different objects; multiple spatially separated acoustic sensing devices; multiple sensors (or detectors) adapted to detect spatiotemporal audio frequency amplitude modulations in signals; an acoustic sensing device adapted to detect observable quantities including one or more of radiance, wavelength, directivity and polarization in signals; an acoustic sensing device adapted to detect polarization in optical signals; an acoustic sensing device adapted to detect polarization in radio frequency (RF) signals; and an acoustic sensing device that includes or is adapted to utilize multiple sensors adapted to facilitate multichannel sound recording and/or acoustic beam forming. Multiple different listening outputs can be provided in relation to and/or facilitating access to particular viewing and/or listening content—such as, for example, an output that is required in relation to generating or providing the (viewing and/or) listening content, or a pair of viewing and listening outputs.

Example embodiments described herein involve a method for obtaining or providing listening that includes extracting or otherwise obtaining from sensing device obtained energy or other outputs (e.g., provided by one or more separate independent sensors or detectors) signals and/or information facilitating the generation and provision of listening content. In a method for obtaining or providing listening (e.g., that involves extracting signals and/or information, and/or obtaining one or more optical signals), a listening output can be generated or provided, for example, by processing or filtering an optical signal from or associated with at least one of said one or more objects to obtain or determine an audio frequency modulation of the intensity of the optical signal (e.g., to observe pyrotechnics, UFO, plume dynamics of rocket). In a method for obtaining or providing listening (e.g., that involves extracting signals and/or information, and/or obtaining one or more RF signals), a listening output can be generated or provided, for example, by processing a radio frequency (RF) signal from or associated with at least one of said one or more objects to obtain measurements of acoustically induced RF Doppler shift (e.g., caused by flight vehicle motion).

Example embodiments described herein involve a method for obtaining or providing listening that includes extracting or otherwise obtaining signals and/or information from sensing device obtained energy or other outputs provided by one or more separate independent sensors (or detectors). In example embodiments and implementations, the method (further) includes utilizing the signals and/or information to facilitate the generation and/or provision of listening content. In example embodiments and implementations, said one or more separate independent sensors include (or consist of) one or more electromagnetic signal (energy) detection-facilitated audio frequency modulation sensing (AFMS) devices.

In example embodiments of the devices and methods for obtaining or providing listening described herein, the AFMS device(s) include, for example: an acoustic sensing device that includes or is adapted to utilize optical and/or radio wave detectors; one or more sensors, transducers, and/or other mechanisms responsive to energy in the optical and/or radio frequency electromagnetic spectral regions; one or more sensing technologies that operate in optical and/or radio frequency electromagnetic spectral regions; an acoustic sensing device that includes or is adapted to simultaneously utilize radio frequency (RF) and optical acoustic sensing techniques; one or more acoustic sensing devices responsive to energy in multiple different electromagnetic spectral regions; acoustic sensing devices respectively directed toward different objects; multiple spatially separated acoustic sensing devices; multiple sensors adapted to detect spatiotemporal audio frequency amplitude modulations in signals; an acoustic sensing device adapted to detect observable quantities including one or more of radiance, wavelength, directivity and polarization in signals; an acoustic sensing device adapted to detect polarization in optical signals; an acoustic sensing device adapted to detect polarization in radio frequency (RF) signals; or an acoustic sensing device that includes or is adapted to utilize multiple sensors adapted to facilitate multichannel sound recording and/or acoustic beam forming.

Example embodiments described herein involve obtaining or providing both viewing and listening (e.g., devices, systems, and methods involving or utilizing images provided by imaging sensor(s) of an image capturing device).

In example embodiments and implementations, a method for obtaining or providing listening (further) includes utilizing electronics associated with, and/or utilizing software or computer executable program(s) to process signals or other outputs of one or more of said imaging device sensor(s) and said listening device sensor(s) for and in relation to providing the sound and/or information to, and/or to control an electronic display or user interface of, or an action or process performed by or involving: one or more of the devices, systems, or elements described herein (the descriptions thereof, being incorporated here by reference).

In example embodiments and implementations, a method for obtaining or providing listening (further) includes utilizing electronics associated with, and/or utilizing software or computer executable program(s) to process signals or other outputs of one or more of said imaging sensor(s) and said one or more separate independent sensors for and in relation to providing the listening output to, and/or to control an electronic display or user interface of, or an action or process performed by or involving: a camera or other image capturing device or system (e.g., including suitable optics, electronics and/or processors, communications and I/O interfaces, and user input mechanisms, as applicable); a device or system for providing, obtaining, utilizing, generating or reproducing sounds (e.g., listening devices, technologies utilized by musicians, composers, editors, or producers of music or soundtracks, in sound design, or involving audio media or listening outputs, signals, or content in general); a hearing aid or hearing augmentation device or system; a safety or assistive device or system for visually and/or hearing impaired persons; headphones, earbuds, a car stereo, a radio, a personal communications and/or computing device, a smartphone, a wearable technology item, a wristwatch, or a media presentation device; a warning or detection device or system, or an aircraft or other vehicle detection device or system; a detection or measurement device or system; a device or system facilitating or utilizing sensory enhancement and/or sensed feedback; a device or system for providing extra-sensory inputs/information to an operator of a vehicle or a machine; or a device or system providing or facilitating a RAS-enhanced virtual reality experience or other RAS-enhanced observing.

Devices and systems and interfaces (e.g., of or provided or utilized by one or more of the devices or systems referenced herein) can be adapted in various ways to provide or facilitate providing sensory inputs. In example implementations, human sensory based inputs are provide or facilitated either alone or in combination with one or more physiological interface provided inputs. For example, one or more devices such as headphones, earbuds, hearing aids and the like, or a car stereo, portable radio, personal communications device (e.g., smartphone), wearable technology item (e.g., wristwatch), or media presentation devices generally can be utilized or adapted to provide listening outputs (e.g., such as described herein) as aural sensory inputs. In some implementations, one or more electronic displays (e.g., of or provided or utilized by one or more of the devices or systems referenced herein), a vehicle-based or -provided display (e.g., head up display), personal communications device (e.g., smartphone), or media presentation devices generally can be utilized or adapted to provide viewing outputs (e.g., such as described herein) as visual sensory inputs. Electronically or otherwise applied or induced inputs can also be provided as part of a sensory interface, and one or more of the aforementioned inputs can be utilized to facilitate, initiate or control one or more functions or components of a sensory interface. A sensory interface can include or be provided in whole or in part by one or more of the various devices or systems herein, and may also include or involve remotely located and/or distributed or shared components (and associated communications devices/mechanisms) as well as simulated, virtual or diagnostic inputs. A sensory interface can include or be provided in whole or in part by one or more sensory augmentation devices or systems, which can include computer or executable program controlled components or elements.

Example embodiments described herein involve or facilitate human sensory augmentation, or more generally, human sensory devices and systems. Such devices and systems can involve or facilitate, for example: physiological and neurological interfaces with one or more human sensory organs, or at or facilitating a neurological situs of, or operational interface provided for, one or more removed or missing sensory organs; sensory organ-replacement and/or -augmentation devices or systems; body part-replacement and/or -augmentation devices or systems; processing modules and/or interfaces and controllers (for the above); or a combination thereof.

In example implementations, outputs of the AFMS device(s) are filtered and/or processed to provide the listing output (which can include sounds and/or information). For example, received signals as detected can indicate that a vehicle is approaching or other RAS activity. Outputs of the AFMS device(s) can be filtered and/or processed, by way of example, utilizing one or more filters or no filter (e.g., in relation to one or more sensor output signals of the AFMS device(s)), multiple filters, different types of filters (e.g., high-pass, low-pass, different wavelength filters, bandpass, dual- or multi-band, dual- or multi-mode, and other filters and, as applicable, utilizing various parameters and coupling structures), adjustable, adaptive, or synthesized filters, and utilizing filter and/or processor inputs including but not limited to: user inputs, processor determined inputs, interrupts, communications device, or other device generated inputs. For example, one or more of the sensors can provide an input utilized in relation to filtering and/or processing. Filter or processor inputs can also be obtained or provided from one or more databases, or in some implementations received from remotely located or other providers of information, inputs, telemetry, commands, control signals, and the like.

In relation to the listening output, for example, a filtering (or signal processing) input, parameter, configuration, or mode of operation can be adjusted responsive to a provided input such as, for example, a user adjustable input in relation to or effecting one or more types of modulation detection and/or in relation to (e.g., electromagnetic spectrum-specific) electronics and/or processing resources (e.g., available to a particular device or system and, in some implementations, user or otherwise selectable) for extracting signal and/or information from sensed electromagnetic energy. Such an input can be determined and/or provided during or as a result of sensing in multiple different (e.g., optical and radio frequency) electromagnetic spectral regions, in consideration of for example a user's preferences, perceptions, and/or performance in relation to content of the respective spectral regions.

For example, such an input can relate to one or more types of modulation, or contrast (e.g., as perceived by a particular user). By way of example, an input determined from or representing a particular combination of inputs (e.g., a preferred combination as indicated by a particular user, or by analysis of the user's performance, for example, in detecting objects with different and/or varying inputs applied) can be provided. By way of another example, a user input derived of or representing a user's perception of (e.g., preferences in relation to) mutually informing viewing and listening outputs can provided.

Figure 6:
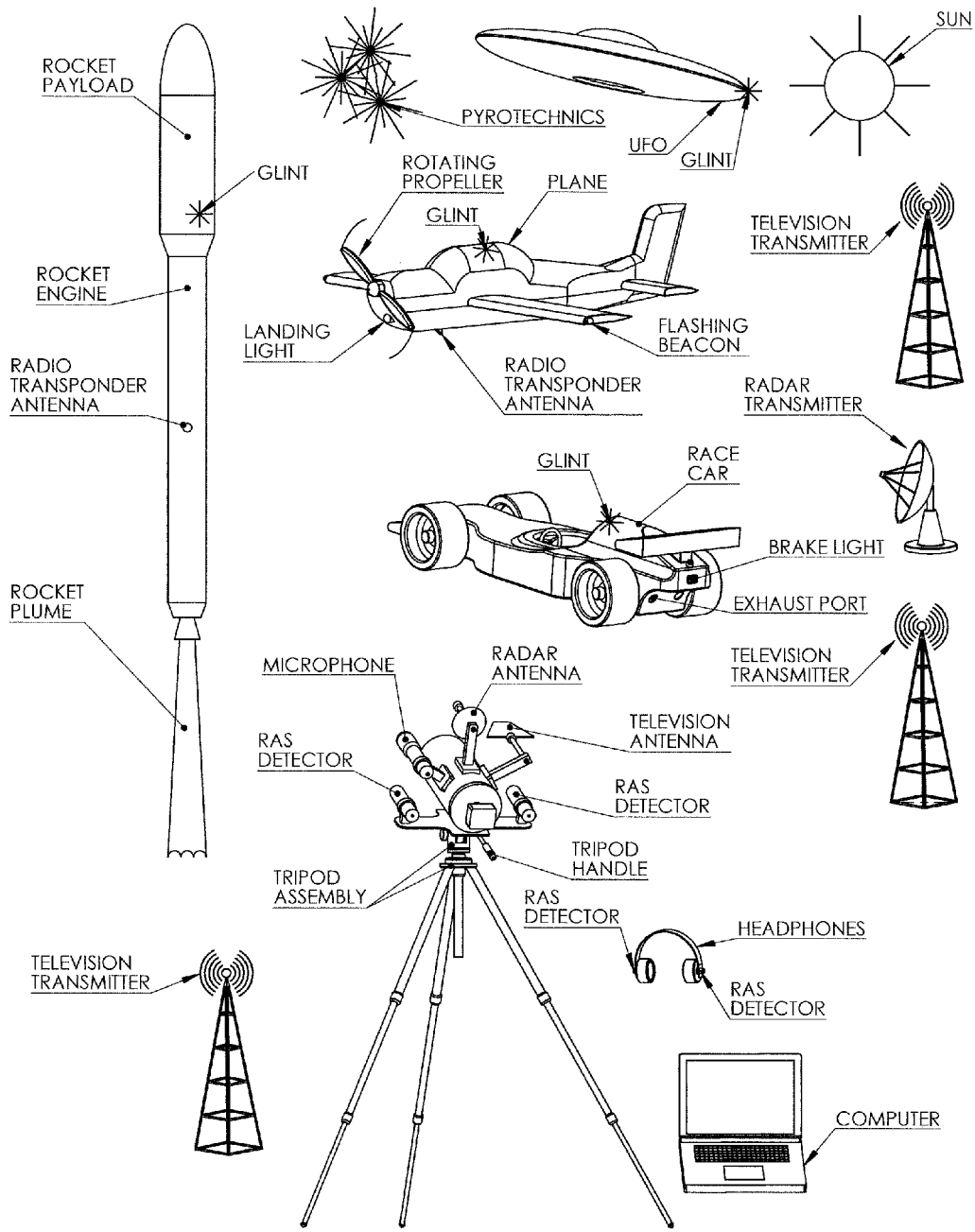
FIG. 6 is an illustration showing an example sound camera, examples of illuminated and/or luminous objects, and example illumination sources.
Figure 7:
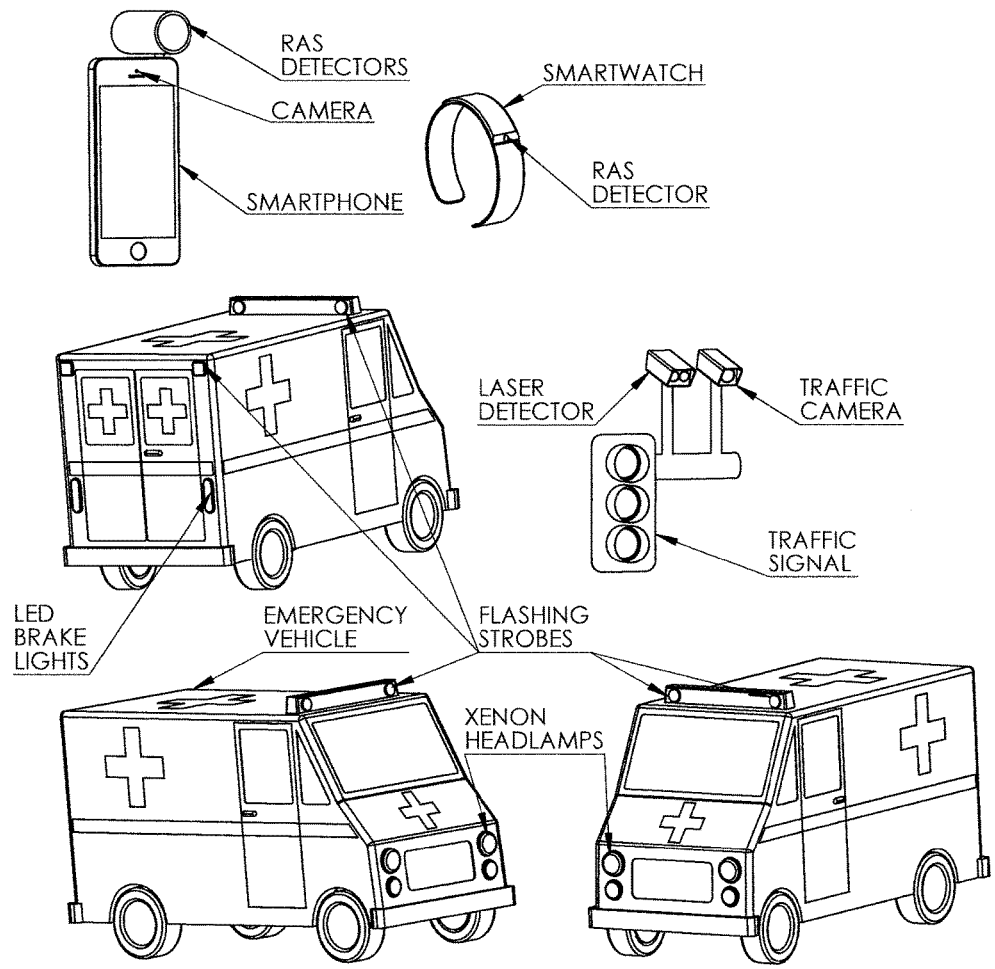
FIG. 7 is an illustration showing additional examples of illuminated and/or luminous objects and illumination sources.

Referring additionally to FIG. 6, example embodiments and implementations described herein involve or facilitate sensing (or detecting) of or in relation to objects, events or phenomena (e.g., areas/sources of actual or potential listening interest to a person or entity and/or in relation to a warning or detection, safety, measuring and analysis, safety, security, monitoring, or other observing). By way of further example, potential areas/sources of listening interest are inter alia discoverable in nature or in relation to or involving vehicles or other man-made objects, fireworks or other pyrotechnics, UFOs and other at least observable objects, events and phenomena.

Example embodiments described herein involve sensing of and in relation to objects, events or phenomena and/or the aforementioned as well as other areas/sources of actual or potential listening interest.

Thus, in example embodiments and implementations, a method for obtaining or providing listening includes: capturing and/or accessing (e.g., previously captured) images provided by one or more imaging device sensors (or detectors) of one or more illuminated and/or luminous objects; utilizing one or more listening device sensors (or detectors) to obtain audio frequency modulated electromagnetic energy from other images of said one or more objects for and in relation to facilitating the generation or provision of sound and/or information in association with said images (e.g., an audio track for a video generated from the video images) including an audio representation or indication of a disturbance to an electromagnetic field or fields at or associated with at least one of said one or more objects; and providing viewing and/or listening content from or associated with the images with additional and/or replacement content including said sound and/or information (e.g., additional or replacement audio for one or more portions of the viewing content). In example embodiments and implementations, a method for obtaining or providing listening (further) includes generating or providing viewing and listening outputs adapted to facilitate, control, or initiate an action or process of (or involving) presenting, reproducing, transmitting, or otherwise communicating or making accessible the additional and/or replacement content (including said sound and/or information) in time synchronization with the viewing and/or listening content or one or more portions or images thereof. In example embodiments and implementations, the sound and/or information is generated or provided in association, and in time synchronization, with said images. In example embodiments and implementations, said one or more listening device sensors (or detectors) are separate and independent from said imaging device sensors—and, in some implementations (e.g., multichannel), separate and independent from each other as well.

In example embodiments and implementations, a method for obtaining or providing listening (further) includes utilizing electronics associated with, and/or utilizing software or computer executable program(s) to process signals or other outputs of one or more of said imaging device sensor(s) and said listening device sensor(s) for and in relation to providing the sound and/or information to, and/or to control an electronic display or user interface of, or an action or process performed by or involving: one or more of the devices, systems, or elements described herein (the descriptions thereof, being incorporated here by reference).

Technologies and methodologies described herein are suitable as well in relation to adapting, modifying, enhancing, or retrofitting an image capturing device to provide a device or mechanism for listening to illuminated and/or luminous objects(s) and/or nearby vicinity.

Example embodiments described herein involve a method for obtaining or providing listening that includes adapting an image capturing device that is capable of (or adaptable to be capable of) capturing images of illuminated and/or luminous objects (e.g., an object that is illuminated by ambient optical, microwave or radio wave electromagnetic energy and/or self-luminous) to obtain audio frequency modulated electromagnetic energy from other images and to generate or facilitate providing a listening output.

Example embodiments described herein involve a method for obtaining or providing listening that includes adapting an image capturing device to utilize one or more separate independent sensor(s) to generate or facilitate providing a listening output of the AFMS device (e.g., in time synchronization) with a viewing output.

Thus, in example embodiments and implementations, a method for obtaining or providing listening includes: adapting an image capturing device that is capable of (or adaptable to be capable of) capturing images of illuminated and/or luminous objects (e.g., an object that is illuminated by ambient optical, microwave or radio wave electromagnetic energy and/or self-luminous) to utilize one or more separate independent sensor(s) including at least one electromagnetic signal detection-facilitated audio frequency modulation sensing (AFMS) device to obtain audio frequency modulated electromagnetic energy from other images captured by or otherwise obtained utilizing said separate independent sensor(s) and to generate or facilitate providing a listening output of the AFMS device in time synchronization with a viewing output including images of one or more illuminated and/or luminous objects, the listening output including signals and/or information indicating or providing a representation of a disturbance to an electromagnetic field or fields at or associated with at least one of said one or more objects, the disturbance being or including an audio frequency modulation of a signal from or associated with at least one of said one or more objects.

In example embodiments and implementations, said step of adapting an image capturing device includes modifying, enhancing, and/or retrofitting the image capturing device integrating or operatively interfacing the image capturing, AFMS device(s) and associated electronics. In example embodiments and implementations, said step of adapting an image capturing device includes providing one or more of the AFMS device(s) as a peripheral of the image capturing device, or as a modular (e.g., internal or external) component or add-on thereof.

In example embodiments and implementations of a method for obtaining or providing listening, the image capturing device is included in or provided as part of: a device or system including, utilizing or involving a hearing aid or hearing augmentation, headphones, earbuds, a car stereo, or a radio; a personal communications and/or computing device or peripheral device thereof, a laptop or notebook computer or tablet, a smartphone, a wearable technology item, a wristwatch, or a media presentation device; a device or system including, utilizing or involving an eye or ear; or one or more of the devices, systems, or elements described herein (the descriptions thereof, being incorporated here by reference).

The image capturing device is, for example, included in or provided as part of a device or system that is capable of capturing or otherwise obtaining, and/or adapted to utilize special purpose computers, software, and/or databases that facilitate specialized detection, measurement, and/or analysis functions, features or processes in relation to: aerospace imagery, telescopic imagery, microscopy imagery, diagnostic imagery, medical imagery, meteorological imagery, military imagery, security imagery, or space imagery.

In example embodiments and implementations, a method for obtaining or providing listening (further) includes adapting electronics associated with, and/or software or computer executable program(s) or a mobile app to process signals or other outputs of, one or more of said imaging capturing device and said AFMS device for and in relation to generating or providing the listening output.

In example embodiments and implementations of a method for obtaining or providing listening, the image capturing device is included in or provided as part of an element including one or more device(s) and/or system(s) (e.g., such as one or more of the devices or systems referenced herein), and the method further includes: adapting electronics associated with and/or software or computer executable program(s) or a mobile app to process signals or other outputs of one or more of said imaging capturing device and said AFMS device for and in relation to providing the listening output to, and/or to control an electronic display or user interface of, or an action or process performed by or involving at least one of said device(s) and/or system(s).

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A device for obtaining or providing listening and viewing, comprising:

an image capturing device comprising at least one sensor for capturing images of illuminated and/or luminous objects, including an object that is illuminated by ambient optical, microwave or radio wave electromagnetic energy and/or self-luminous, said image capturing device using said images captured by said at least one sensor to provide a single output consisting of viewing data, and an electromagnetic signal detection-facilitated audio frequency modulation sensing (AFMS) device having at least one other sensor separate and distinct from said at least one sensor for capturing images of one or more of said illuminated and/or luminous objects, said AFMS device including circuitry to obtain audio frequency modulated electromagnetic energy from said images captured by said at least one other sensor and to use the same to provide a single output consisting of listening data in time synchronization with said viewing data output from said image capturing device, the listening data including signals and/or information indicating or providing a representation of a disturbance to an electromagnetic field or fields at or associated with at least one of said one or more objects, the disturbance being or including an audio frequency modulation of a signal from or associated with at least one of said one or more objects, said image capturing device and said AFMS device having mutually exclusive outputs, wherein said single output from said image capturing device consists exclusively of said viewing data, and said single output from said AFMS device consists exclusively of said listening data.

2. The device for obtaining or providing listening of claim 1, wherein said at least one other sensor is optically based.

3. The device for obtaining or providing listening of claim 1, wherein said at least one other sensor implements or is adapted to utilize one or more radio frequency (RF) demodulation or detection technologies.

4. The device for obtaining or providing listening of claim 1, wherein the AFMS device includes one or more optically based audio frequency modulation sensors.

5. The device for obtaining or providing listening of claim 1, wherein the AFMS device includes multiple detectors with spatially separated views, said AFMS device and associated electronics being adapted to facilitate stereophonic or multichannel audio frequency sensing.

6. The device for obtaining or providing listening of claim 1, wherein the AFMS device includes multiple detectors with observing site separation, polarization separation or wavelength separation, said AFMS device and associated electronics being adapted to facilitate stereophonic or multichannel sound sensing.

7. The device for obtaining or providing listening of claim 1, wherein the AFMS device includes multiple optical and/or radio frequency (RF) receivers with observing site separation, said AFMS device and associated electronics being adapted to facilitate stereophonic or multichannel sound sensing.

8. The device for obtaining or providing listening of claim 1, wherein the AFMS device includes multiple radio frequency (RF) receivers with observing site separation, said AFMS device and associated electronics being adapted to facilitate stereophonic or multichannel sound sensing.

9. The device for obtaining or providing listening of claim 1, wherein the AFMS device includes one or more optical detectors with or adapted to provide polarization separation, said AFMS device and associated electronics being adapted to facilitate stereophonic or multichannel sound sensing.

10. The device for obtaining or providing listening of claim 1, wherein the AFMS device include one or more radio frequency (RF) detectors with or adapted to provide polarization separation, said AFMS device and associated electronics being adapted to facilitate stereophonic or multichannel sound sensing.

11. The device for obtaining or providing listening of claim 1, wherein the one or more illuminated and/or luminous objects include an object that is illuminated by ambient optical, microwave or radio wave electromagnetic energy and/or self-luminous.

12. The device for obtaining or providing listening of claim 1, wherein the one or more illuminated and/or luminous objects include an object that is self-fluctuating.

13. The device for obtaining or providing listening of claim 1, wherein the one or more illuminated and/or luminous objects include an object that is an emissive object, a glinting object, or a combination thereof.

14. The device for obtaining or providing listening of claim 1, wherein the one or more illuminated and/or luminous objects include one or more portions of a rocket, a spacecraft, or other vehicle.

15. The device for obtaining or providing listening of claim 1, wherein the disturbance includes an audio frequency modulation of a local optical or radio frequency environment in relation to at least one of said one or more objects.

16. The device for obtaining or providing listening of claim 1, wherein the disturbance include an audio frequency modulations of local optical and radio frequency environments in relation to said one or more objects.

17. The device for obtaining or providing listening of claim 1, wherein the disturbance includes an audio frequency modulation of an optical illumination source.

18. The device for obtaining or providing listening of claim 1, wherein the disturbance includes an audio frequency modulation of the luminosity of at least one of said one or more objects and/or nearby vicinity.

19. The device for obtaining or providing listening of claim 1, wherein the disturbance include an audio frequency modulation of the intensity of an optical signal from or associated with at least one of said one or more objects.

20. The device for obtaining or providing listening of claim 1, wherein the disturbance is or includes an audio frequency modulation resulting from one or more of: an acoustic source, a vibration source, and a direct electrical modulation.

21. The device for obtaining or providing listening of claim 1, wherein the disturbance is or include an audio frequency modulation resulting from one or more of: an acoustic or vibration source and a direct electrical modulation.

22. The device for obtaining or providing listening of claim 1, wherein the disturbance is or includes an audio frequency modulation resulting from an acoustic or vibration source.

23. The device for obtaining or providing listening of claim 1, wherein the disturbance is or includes an audio frequency modulation resulting from a direct electrical modulation.

24. The device for obtaining or providing listening of claim 1, wherein the disturbance is or includes an acoustic or vibration modulation of a signal from or associated with at least one of said one or more objects.

25. The device for obtaining or providing listening of claim 1, wherein the disturbance is or includes an audio frequency non-acoustic modulation of a signal from or associated with at least one of said one or more objects.

26. The device for obtaining or providing listening of claim 1, wherein the disturbance further comprises a radioacoustic modulation of a radio wave illumination source.

27. The device for obtaining or providing listening of claim 1, wherein the disturbance further comprises a radioacoustic modulation of a luminance mechanism associated with at least one or more objects.

28. The device for obtaining or providing listening of claim 1, wherein the disturbance causes a spectral broadening of a Doppler signal from or associated with at least one of said one or more objects.

29. The device for obtaining or providing listening of claim 1, wherein the disturbance further comprises one or more of a phase modulation and a frequency modulation of a radio frequency (RF) signal.

30. The device for obtaining or providing listening of claim 1, wherein the disturbance comprises an audio frequency and/or phase modulation of a signal from or associated with at least one of said one or more objects.

31. The device for obtaining or providing listening of claim 1, wherein the audio output includes audio modulation components extracted from signals received from or associated with at least one of said one or more objects.

32. The device for obtaining or providing listening of claim 1, wherein the at least one other sensor of the AFMS device is responsive to energy in the optical and/or radio frequency electromagnetic spectral regions.

33. The device for obtaining or providing listening of claim 1, wherein the image capturing device is or includes one or more of: an imaging telescope, a telescopic camera, an imaging microscope, a microscopy camera, a video camera, a digital camera, a television camera, a tracking system/telescope, and space-based sensors or other assets.

34. The device for obtaining or providing listening of claim 1, wherein the image capturing device comprises a cinema camera that includes or utilizes one or more photographic technologies selected from the group comprising: space-compatible photographic, long range imaging, atmospheric seeing compensation, and aerial platforms technologies.

35. The device for obtaining or providing listening of claim 1, wherein the image capturing device is or includes one or more of: a night vision camera, a full spectrum digital camera, a full spectrum motion camera, and an Infrared (IR) camera.

36. The device for obtaining or providing listening of claim 1, wherein one or more of the image capturing device and the AFMS device includes or is adapted to utilize optical and/or radio wave detectors.

37. The device for obtaining or providing listening of claim 1, wherein one or more of the image capturing device and the AFMS device includes or is adapted to utilize one or more sensing technologies that operate in optical and/or radio frequency electromagnetic spectral regions.

38. The device for obtaining or providing listening of claim 1, wherein one or more of the image capturing device and the AFMS device includes or is adapted to simultaneously utilize radio frequency (RF) and optical AFMS sensing techniques.

39. The device for obtaining or providing listening of claim 1, wherein at least said AFMS device is adapted to detect spatiotemporal audio frequency amplitude modulations in signals from or associated with at least one of said one or more objects.

40. The device for obtaining or providing listening of claim 1, wherein at least the AFMS device is adapted to detect observable quantities including one or more of radiance, wavelength, directivity and polarization in signals from or associated with at least one of said one or more objects.

41. The device for obtaining or providing listening of claim 1, wherein at least the AMFS device is adapted to detect polarization in optical signals from or associated with at least one of said one or more objects.

42. The device for obtaining or providing listening of claim 1, wherein at least the AMFS device is adapted to detect polarization in radio frequency (RF) signals from or associated with at least one of said one or more objects.

43. The device for obtaining or providing listening of claim 1, wherein the AFMS device includes or is adapted to utilize multiple sensors adapted to facilitate multichannel sound recording and/or acoustic beam forming.

44. The device for obtaining or providing listening of claim 1, wherein one or more of the image capturing device, the AFMS device, and the associated electronics includes or is adapted to utilize an antenna and/or a radio receiver.

45. The device for obtaining or providing listening of claim 1, wherein the image capturing device is adapted to utilize radar signals from or associated with at least one of said one or more objects and inverse synthetic aperture radar (ISAR) techniques to produce images.

46. The device for obtaining or providing listening of claim 1, wherein the image capturing device is adapted to utilize radar signals including or providing information involving detected differential motion to provide or facilitate generation of images.

47. The device for obtaining or providing listening of claim 1, further comprising electronics adapted to provide a synchronized high resolution picture and sound combination.

48. The device for obtaining or providing listening of claim 1, further comprising:
   means for presenting the viewing and listening outputs as a sound movie including time synchronized single or multichannel audio.

49. A method for generating a multimedia output, comprising:
   capturing video data of at least one object using an image capturing device comprising at least one sensor;
   capturing image data of said at least one object using an audio frequency modulation sensing (AFMS) device comprising at least one other sensor, said at least one other sensor being separate and distinct from said at least one sensor;
   extracting audio data from said image data; and
   providing said multimedia output, said multimedia output comprising said audio data in time synchronization with said video data;
   wherein said image capturing device and said AFMS device have mutually exclusive outputs, said video data in said multimedia output is derived exclusively from said image capturing device, and said audio data in said multimedia output is derived exclusively from said AFMS device.

50. The method of claim 49, wherein said at least one other sensor comprises a plurality of sensors, and said step of extracting audio data from said image data further comprises extracting first audio data from image data captured by a first one of said plurality of sensors and extracting second audio data from image data captured by a second one of said plurality of sensors.

51. The method of claim 50, wherein said first and second audio data is used to create stereophonic sound.

52. The method of claim 49, wherein said step of extracting audio data from said image data comprises detecting at least one intensity of audio frequency modulated electromagnetic energy in said image data.

53. The method of claim 52, further comprising the step of detecting at least one intensity of audio frequency modulated electromagnetic energy in radio frequency (RF) data associated with said at least one object, wherein said audio data is based on at least said intensities of audio frequency modulated electromagnetic energy in both said image data and said RF data.

54. The method of claim 53, further comprising the step of detecting at least one phase of audio frequency modulated electromagnetic energy in said RF data, wherein said audio data is based on at least said intensities of audio frequency modulated electromagnetic energy in said image data and said RF data and said at least one phase of audio frequency modulated electromagnetic energy in said RF data.

55. The method of claim 49, further comprising the step amplifying said image data before said audio data is extracted from image data.

56. The method of claim 49, further comprising the step of filtering said image data before said audio data is extracted from said image data.

57. A system for generating a multimedia output, comprising:
- an image capturing device having at least one sensor for capturing video data of at least one object;
- an audio frequency modulation sensing (AFMS) device having at least one other sensor for capturing image data of said at least one object and electronics for extracting audio data from said image data, said at least one other sensor being different from said at least one sensor; and
- at least one processor for providing said multimedia output, said multimedia output having said audio data in time synchronization with said video data;
- wherein said image capturing device and said AFMS device have mutually exclusive outputs, said video data in said multimedia output is derived exclusively from said image capturing device, and said audio data in said multimedia output is derived exclusively from said AFMS device.

58. The system of claim 57, wherein said at least one sensor comprises a video camera.

59. The system of claim 58, wherein said image capturing device further comprises a telescopic feature.

60. The system of claim 57, wherein said at least one other sensor comprises a remote acoustic sensing (RAS) sensor.

61. The system of claim 60, wherein said AFMS device further comprises a telescopic feature.

62. The system of claim 57, wherein said at least one other sensor comprises a plurality of sensors, said extraction of said audio data from said image data further comprising extracting first audio data from image data captured by a first one of said plurality of sensors and second audio data from image data captured by a second one of said plurality of sensors.

63. The system of claim 57, wherein said electronics are configured to extract said audio data from said image data by detecting intensity of audio frequency modulated extracted energy in said image data.

64. The system of claim 63, wherein said electronics are further configured to detect an intensity of audio frequency modulated electromagnetic energy in radio frequency (RF) data associated with said at least one object, wherein said audio data is based on at least said intensities of audio frequency modulated electromagnetic energy in both said image data and said RF data.

65. The system of claim 63, wherein said electronics are further configured to detect a phase of audio frequency modulated electromagnetic energy in said RF data, wherein said audio data is based on at least said intensity of audio frequency modulated electromagnetic energy in said image data and said phase of audio frequency modulated electromagnetic energy in said RF data.

66. The system of claim 57, wherein said electronics are further configured to amplify at least said image data.

67. The system of claim 57, wherein said electronics are further configured to filter at least said image data.

* * * * *